(12) United States Patent
Xu et al.

(10) Patent No.: US 12,113,986 B2
(45) Date of Patent: Oct. 8, 2024

(54) INTERACTION BETWEEN SCREEN CONTENT CODING TOOLS AND MOTION INFORMATION

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Weijia Zhu, San Diego, CA (US); Kai Zhang, San Diego, CA (US); Hongbin Liu, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 191 days.

(21) Appl. No.: 17/551,392

(22) Filed: Dec. 15, 2021

(65) Prior Publication Data

US 2022/0109852 A1 Apr. 7, 2022

Related U.S. Application Data

(63) Continuation of application No. PCT/CN2020/096129, filed on Jun. 15, 2020.

(30) Foreign Application Priority Data

Jun. 16, 2019 (WO) ................ PCT/CN2019/091446

(51) Int. Cl.
*H04N 19/139* (2014.01)
*H04N 19/159* (2014.01)
(Continued)

(52) U.S. Cl.
CPC ......... *H04N 19/139* (2014.11); *H04N 19/159* (2014.11); *H04N 19/176* (2014.11); *H04N 19/593* (2014.11); *H04N 19/96* (2014.11)

(58) Field of Classification Search
CPC .... H04N 19/176; H04N 19/172; H04N 19/17; H04N 19/61; H04N 19/615;
(Continued)

(56) References Cited

U.S. PATENT DOCUMENTS 9,591,325 B2 3/2017 Li et al.
9,860,559 B2 1/2018 Zhang et al.
(Continued)

FOREIGN PATENT DOCUMENTS

CN 105208396 A 12/2015

OTHER PUBLICATIONS

Bross et al. "Versatile Video Coding (Draft 5)," Joint Video Experts Team (JVET) of ITU-T SG 16 WP 3 and ISO/IEC ITC 1/SC 29/WG 11 14th Meeting: Geneva, CH, Mar. 19-27, 2019, document JVET-N1001, 2019.
(Continued)

*Primary Examiner* — Nathnael Aynalem
(74) *Attorney, Agent, or Firm* — Perkins Coie LLP

(57) ABSTRACT

Interaction between screen content coding tools and motion information is disclosed. A method of video processing includes modifying, for a conversion between a block of a video and a bitstream representation of the block, at least one of motion information associated with the block which is coded with intra block copy (IBC) mode; and performing the conversion based on the modified motion information.

18 Claims, 34 Drawing Sheets

SPLIT_BT_VER

SPLIT_BT_HOR

SPLIT_TT_VER

SPLIT_TT_HOR

(51) Int. Cl.
*H04N 19/176* (2014.01)
*H04N 19/593* (2014.01)
*H04N 19/96* (2014.01)

(58) Field of Classification Search
CPC .. H04N 19/107; H04N 19/109; H04N 19/105; H04N 19/96; H04N 19/52; H04N 19/159; H04N 19/167; H04N 19/513; H04N 19/103; H04N 19/174; H04N 19/182; H04N 19/51; H04N 19/517; H04N 19/503; H04N 19/50
USPC .......................................... 375/240.01–240.29
See application file for complete search history.

(56) References Cited

U.S. PATENT DOCUMENTS

| | | | |
|---|---|---|---|
| 9,877,043 | B2 | 1/2018 | He et al. |
| 9,883,197 | B2 | 1/2018 | Chen et al. |
| 9,918,105 | B2 | 3/2018 | Pang et al. |
| 10,055,189 | B2 | 8/2018 | Tsai et al. |
| 10,136,140 | B2 | 11/2018 | Li et al. |
| 10,148,981 | B2 | 12/2018 | Zhu et al. |
| 10,178,403 | B2 | 1/2019 | Seregin et al. |
| 10,284,874 | B2 | 5/2019 | He et al. |
| 10,306,240 | B2 | 5/2019 | Kiu et al. |
| 10,368,091 | B2 | 7/2019 | Li et al. |
| 10,368,092 | B2 | 7/2019 | Li et al. |
| 10,375,416 | B1* | 8/2019 | Wenger ............... H04N 19/174 |
| 10,469,863 | B2 | 11/2019 | Zhu et al. |
| 10,582,213 | B2 | 3/2020 | Li et al. |
| 10,638,140 | B2 | 4/2020 | Seregin et al. |
| 10,812,817 | B2 | 10/2020 | Li et al. |
| 10,820,015 | B2 | 10/2020 | Zhang et al. |
| 11,095,917 | B2 | 8/2021 | Zhang et al. |
| 2016/0100179 | A1 | 4/2016 | He et al. |
| 2016/0241858 | A1 | 8/2016 | Li et al. |
| 2016/0360210 | A1 | 12/2016 | Xiu et al. |
| 2018/0307457 | A1 | 10/2018 | Tsai et al. |
| 2019/0158854 | A1 | 5/2019 | He et al. |
| 2019/0200038 | A1 | 6/2019 | He et al. |
| 2019/0238864 | A1 | 8/2019 | Xiu et al. |
| 2020/0092579 | A1 | 3/2020 | Zhu et al. |
| 2020/0177910 | A1 | 6/2020 | Li et al. |
| 2020/0195960 | A1 | 6/2020 | Zhang et al. |
| 2021/0021811 | A1 | 1/2021 | Xu et al. |
| 2021/0152833 | A1* | 5/2021 | Gao .................... H04N 19/593 |
| 2021/0160533 | A1 | 5/2021 | Zhang et al. |
| 2021/0235074 | A1 | 7/2021 | Liu et al. |
| 2021/0250592 | A1 | 8/2021 | Xiu et al. |
| 2021/0274201 | A1 | 9/2021 | Xu et al. |
| 2021/0274202 | A1 | 9/2021 | Xiu et al. |
| 2021/0281856 | A1 | 9/2021 | Liu et al. |
| 2021/0281877 | A1 | 9/2021 | Liu et al. |
| 2021/0314610 | A1 | 10/2021 | Xu et al. |
| 2021/0360262 | A1 | 11/2021 | Li et al. |
| 2021/0377561 | A1 | 12/2021 | Zhang et al. |
| 2022/0014775 | A1* | 1/2022 | Lee ..................... H04N 19/157 |

OTHER PUBLICATIONS

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

Dias "CE10: Ciip Using Explicit Signaling of Weights (CE10-1.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0298, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.

Nam et al. "CE8-Related: Modified Block Vector Coding for IBC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0459, 2019.

Pfaff et al. "CE3: Affine Linear Weighted Intra Prediction (Yest 1.2.1, Test 1.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0043, 2019.

Pfaff et al. "CE3: Affine Linear Weighted Intra Prediction (CE3-4.1, CE3-4.2)," Joint Video Experts Team (JVET) of TU-T SG 16 WP 3 and ISO/IEC JTC 1/SC 29/WG 11 14th Meeting: Geneva, CH, Mar. 19-27, 2019, docummont IVET-N0217, 2019.

Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

Van et al. "CE10: CIIP with Position-Independent Weights (Test CE10-1.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0302, 2019.

Xu et al. "CE8-Related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

International Search Report and Written Opinion from PCT/CN2020/096129 dated Aug. 28, 2020 (10 pages).

\* cited by examiner

INTERACTION BETWEEN SCREEN CONTENT CODING TOOLS AND MOTION INFORMATION

CROSS-REFERENCE TO RELATED APPLICATION

This application is a continuation application of International Application No. PCT/CN2020/096129 filed on Jun. 15, 2020 which timely claim the priority to and benefits of International Patent Application No. PCT/CN2019/091446, filed on Jun. 16, 2019. All the aforementioned patent applications are hereby incorporated by reference in their entireties.

TECHNICAL FIELD

This patent document is directed generally to video coding and decoding technologies.

BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the next generation Versatile Video Coding (VVC) standard targeting at 50% bitrate reduction compared to HEVC.

SUMMARY

Using the disclosed video coding, transcoding or decoding techniques, embodiments of video encoders or decoders can handle virtual boundaries of coding tree blocks to provide better compression efficiency and simpler implementations of coding or decoding tools.

In one example aspect, a method of video processing is disclosed. The method includes determining, during a conversion between a current video block of a video picture and a bitstream representation of the current video block, a block vector difference (BVD) representing a difference between a block vector corresponding to the current video block and a predictor thereof and performing the conversion between a current video block and a bitstream representation of the current video block using the block vector. Here, the block vector indicates a motion match for the current video block in the video picture and a modified value of the BVD is coded in the bitstream representation.

In another example aspect, a method of video processing is disclosed. The method includes determining, during a conversion between a current video block of a video picture and a bitstream representation of the current video block, to use an intra block copy tool for the conversion and performing the conversion using a modified block vector predictor that corresponds to a modified value of a block vector difference (BVD) for the current video block.

In another example aspect, a method of video processing is disclosed. The method includes performing a conversion between a current video block of a video picture and a bitstream representation of the current video block using an intra block copy coding tool in which a modified block vector corresponding to a modified value of a block vector that is includes in the bitstream representation is used for the conversion.

In another example aspect, a method of video processing is disclosed. The method includes determining, during a conversion between a current video block and a bitstream representation of the current video block, a weighting factor wt based on a condition of the current video block and performing the conversion using a combined intra-inter coding operation in which the weighting factor wt is used for weighting a motion vector of the current video block.

In another example aspect, a method of video processing is disclosed. The method includes determining, to use a triangular partitioning mode (TPM) coding tool for a conversion between a current video block and a bitstream representation of the current video block, wherein at least one operational parameter of the TPM coding tool depends on a characteristic of the current video block, wherein the TPM coding tool partitions the current video block into two non-rectangular partitions that are separately coded and performing the conversion by applying the TPM coding tool that uses the one operational parameter.

In another example aspect, a method of video processing is disclosed. The method includes modifying, for a conversion between a block of a video and a bitstream representation of the block, at least one of motion information associated with the block which is coded with intra block copy (IBC) mode; and performing the conversion based on the modified motion information.

In another example aspect, a method of video processing is disclosed. The method includes determining, for a conversion between a block of a video and a bitstream representation of the block, a weighting factor for intra prediction signal in Combined intra-inter prediction (CIIP) mode based on a motion vector (MV) associated with the block; and performing the conversion based on the weighting factor.

In another example aspect, a method of video processing is disclosed. The method includes determining, for a conversion between a block of a video and a bitstream representation of the block, weights used in Triangular prediction mode (TPM) mode based on motion information of one or more partitions of the block; and performing the conversion based on the weights.

In another example aspect, a method of video processing is disclosed. The method includes determining, for a conversion between a block of a video and a bitstream representation of the block, whether blending process is applied in Triangular prediction mode (TPM) mode based on transform information of the block; and performing the conversion based on the determination.

In yet another example aspect, a video encoding apparatus configured to perform an above-described method is disclosed.

In yet another example aspect, a video decoder that is configured to perform an above-described method is disclosed.

In yet another example aspect, a machine-readable medium is disclosed. The medium stores code which, upon execution, causes a processor to implement one or more of the above-described methods.

The above and other aspects and features of the disclosed technology are described in greater detail in the drawings, the description and the claims.

DETAILED DESCRIPTION

Figure 1:
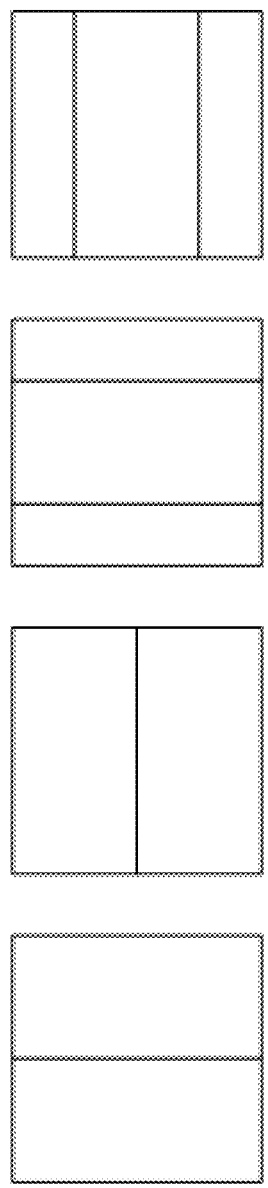
FIG. 1 shows an example of Multi-type tree splitting modes.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Brief summary

This document is related to video coding technologies. Specifically, it is related to prediction block generation. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Partitioning of the CTUs using a tree structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 1, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 2:
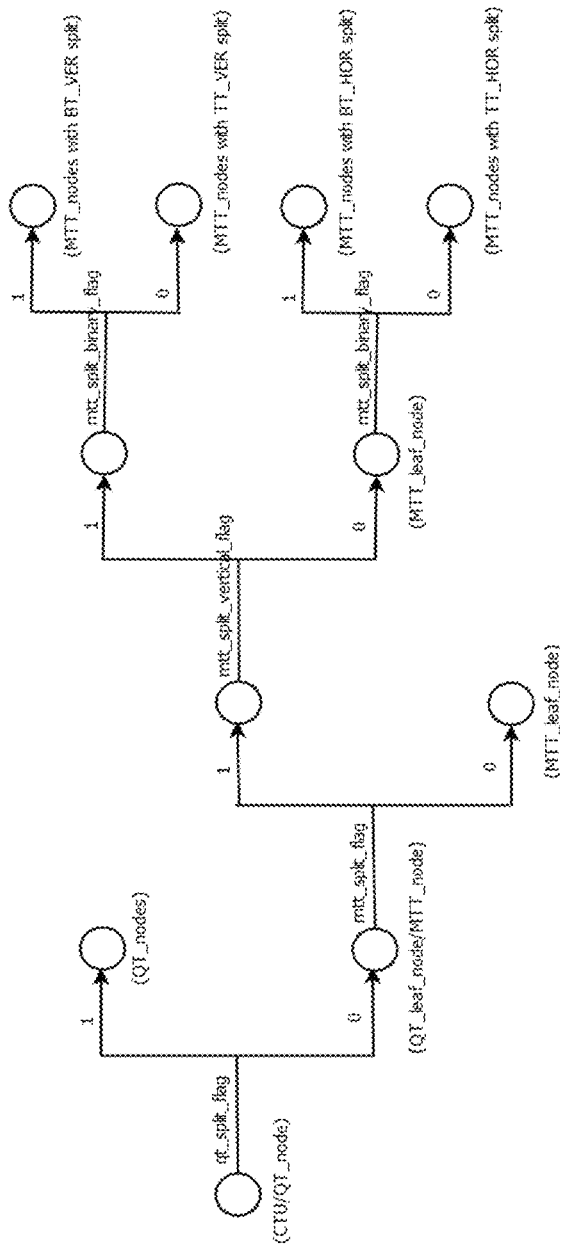
FIG. 2 shows an example of Splitting flags signalling in quadtree with nested multi-type tree coding tree structure.

FIG. 2 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

TABLE 1

MttSplitMode derviation based on multi-type tree syntax elements

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 3:
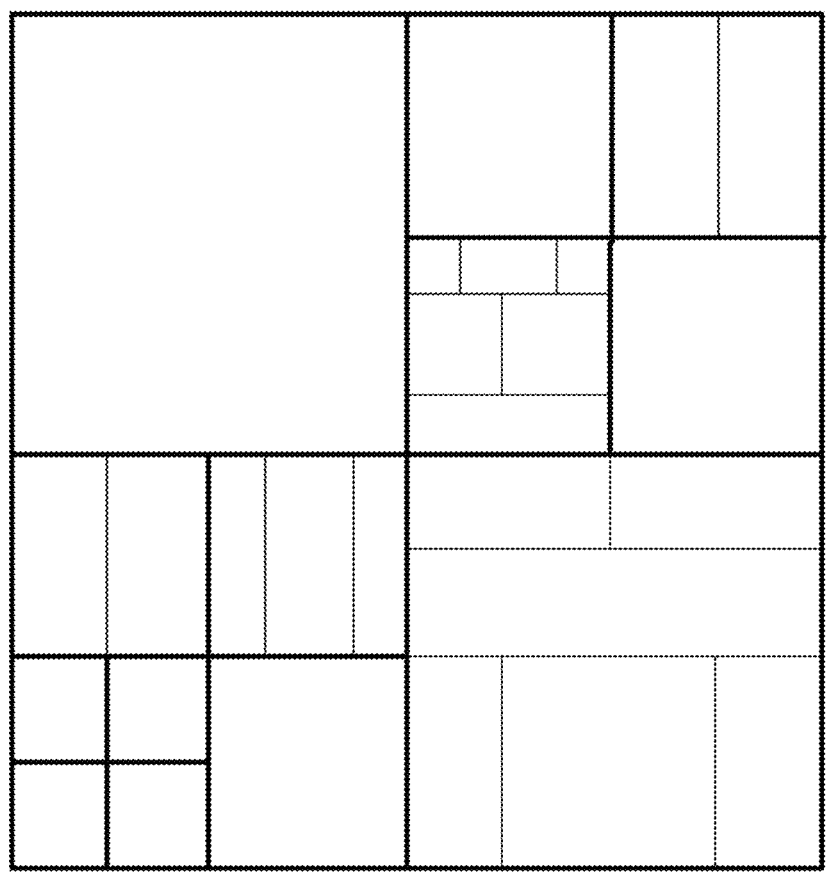
FIG. 3 shows an example of quadtree with nested multi-type tree coding block structure.

FIG. 3 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

Figure 4:
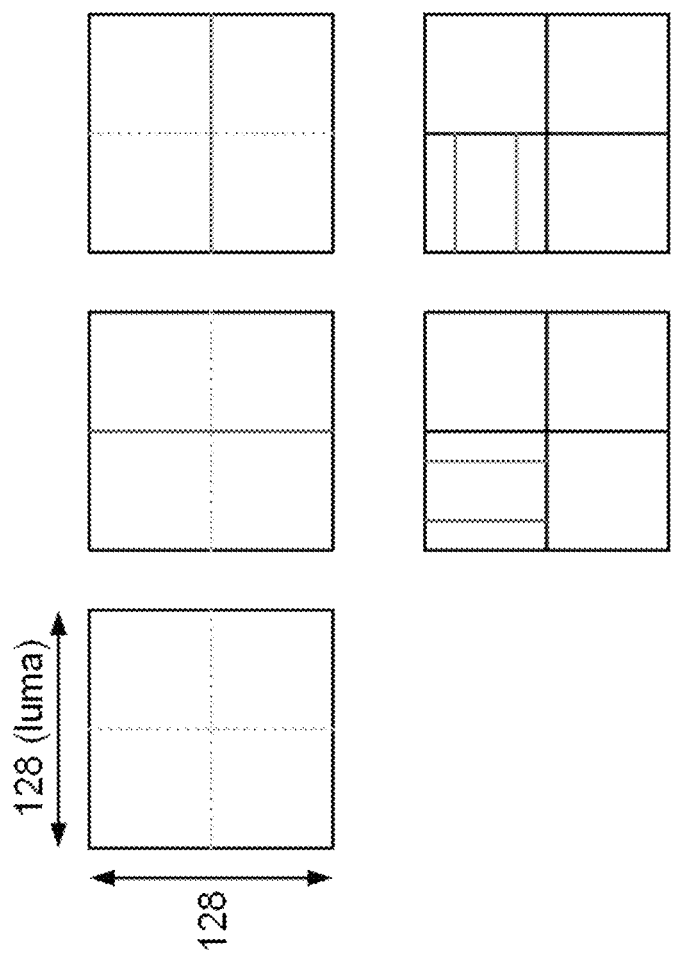
FIG. 4 shows an example of No TT split for 128×128 coding block.

In VVC, the maximum supported luma transform size is 64×64 and the maximum supported chroma transform size is 32×32. When the width or height of the CB is larger the To allow 64×64 Luma block and 32×32 Chroma pipelining design in VVC hardware decoders, TT split is forbidden when either width or height of a luma coding block is larger than 64, as shown in FIG. 4. TT split is also forbidden when either width or height of a chroma coding block is larger than 32.

In VTM5, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

2.2. Intra Prediction in VVC
2.2.1. 67 Intra Prediction Modes

Figure 5:
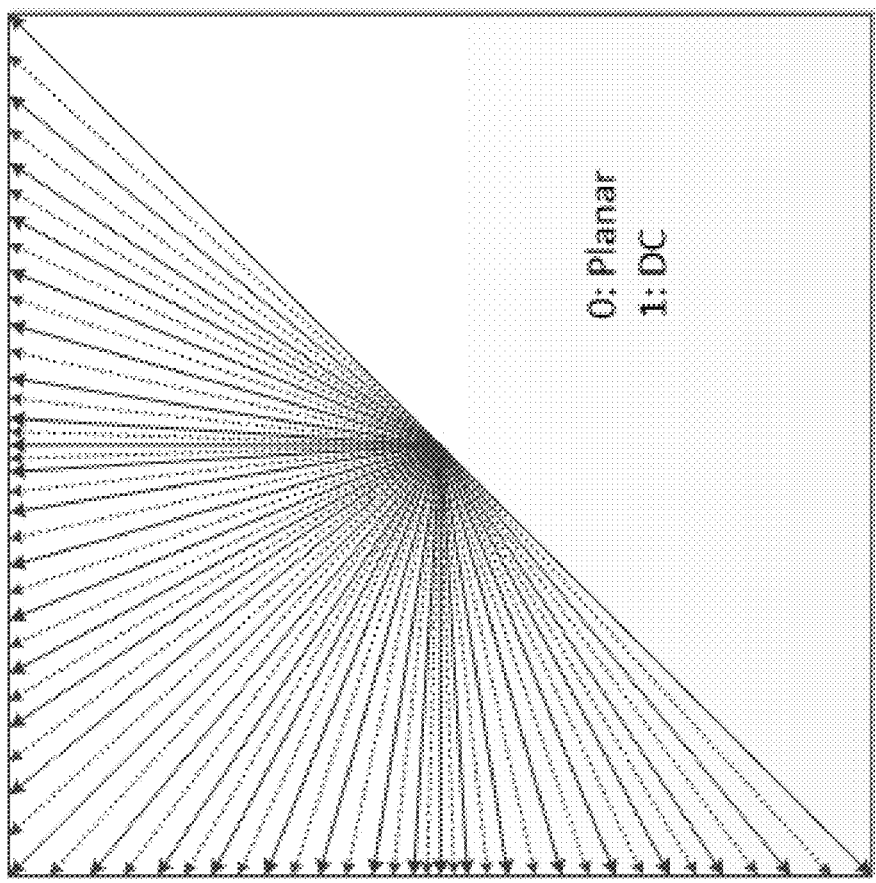
FIG. 5 shows 67 intra prediction modes.

To capture the arbitrary edge directions presented in natural video, the number of directional intra modes in VTM4 is extended from 33, as used in HEVC, to 65. The new directional modes not in HEVC are depicted as red dotted arrows in FIG. 5, and the planar and DC modes remain the same. These denser directional intra prediction modes apply for all block sizes and for both luma and chroma intra predictions.

2.2.2. Position Dependent Intra Prediction Combination (PDPC)

In the VTM4, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where $R_{x,-1}$, $R_{-1,y}$ represent the reference samples located at the top and left of current sample (x,y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

2.2.3. Cross-Component Linear Model Prediction (CCLM)

Figure 6:
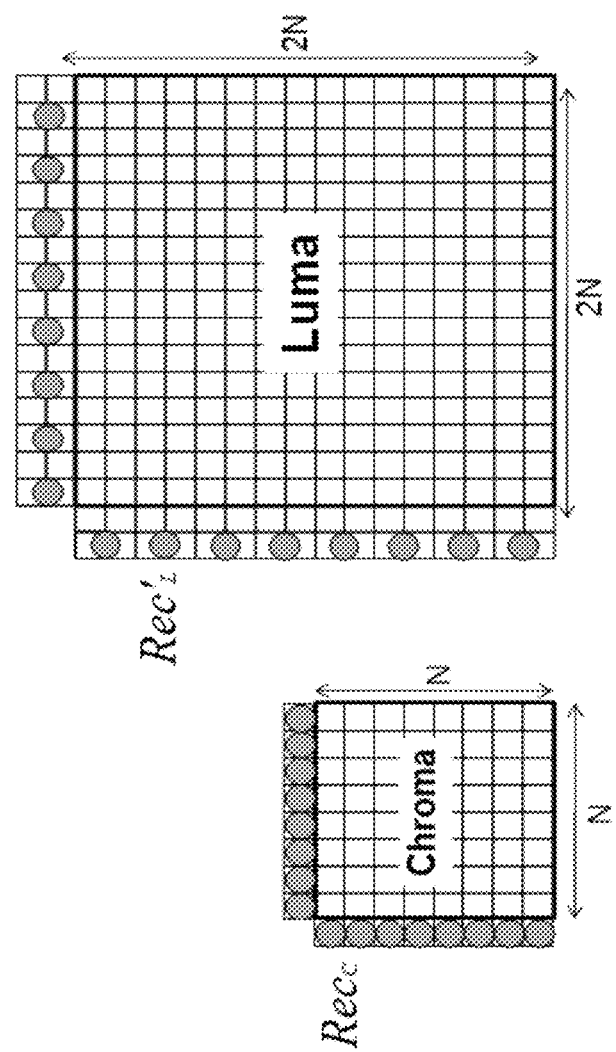
FIG. 6 shows example Locations of the samples used for the derivation of $\alpha$ and $\beta$.

To reduce the cross-component redundancy, a cross-component linear model (CCLM) prediction mode is used in the VTM4, for which the chroma samples are predicted based on the reconstructed luma samples of the same CU by using a linear model as follows:

$$\text{pred}_C(i,j) = \alpha \cdot \text{rec}_L'(i,j) + \beta$$

where $\text{pred}_C(i,j)$ represents the predicted chroma samples in a CU and $\text{rec}_L(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. FIG. 6 shows an example of the location of the left and above samples and the sample of the current block involved in the CCLM mode.

This parameter computation is performed as part of the decoding process, and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.2.4. Multiple Reference Line (MRL) Intra Prediction

Figure 7:
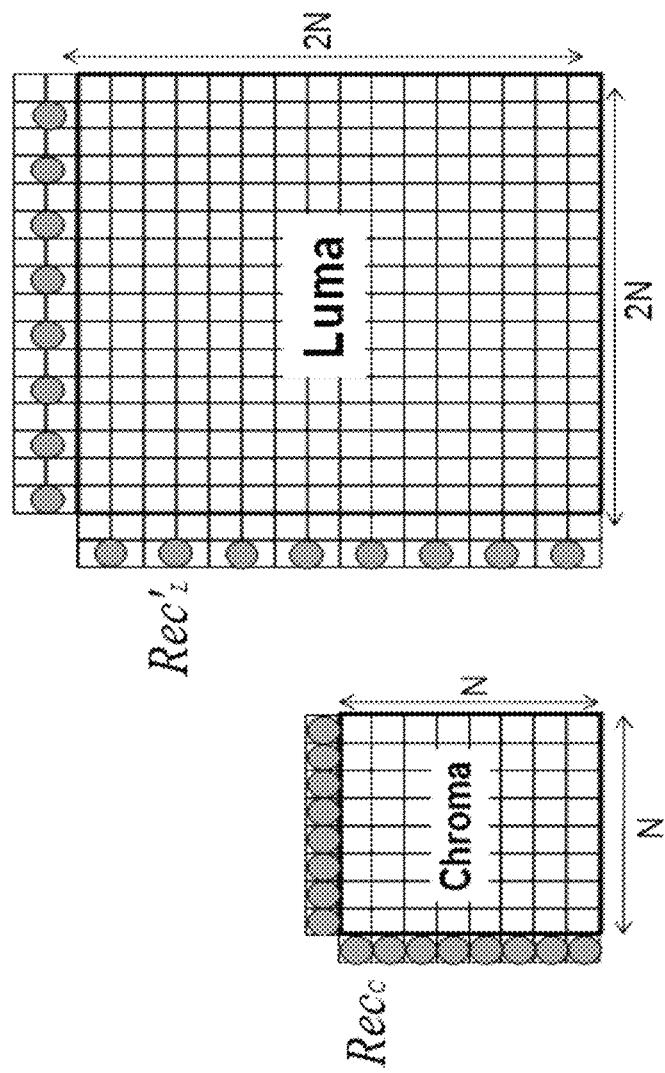
FIG. 7 shows an example of example of four reference lines neighboring to a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used. The index of selected reference line (mrl_idx) is signalled and used to generate intra predictor. For reference line idx, which is greater than 0, only include additional reference line modes in MPM list and only signal mpm index without remaining mode.

2.2.5. Intra Sub-Partitions (ISP)

Figure 8A:
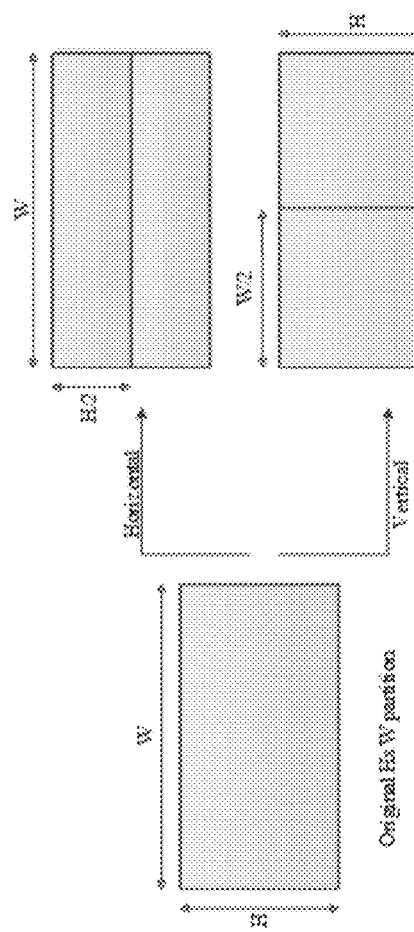
FIGS. 8A-8B show examples of sub-partitions for 4×8 and 8×4 CUs and examples of sub-partitions for CUs other than 4×8, 8×4 and 4×4, respectively.
Figure 8B:
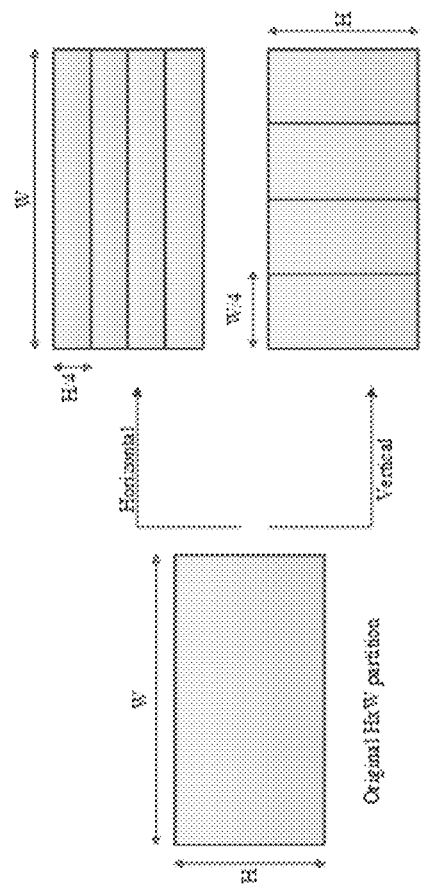
Figure 9:
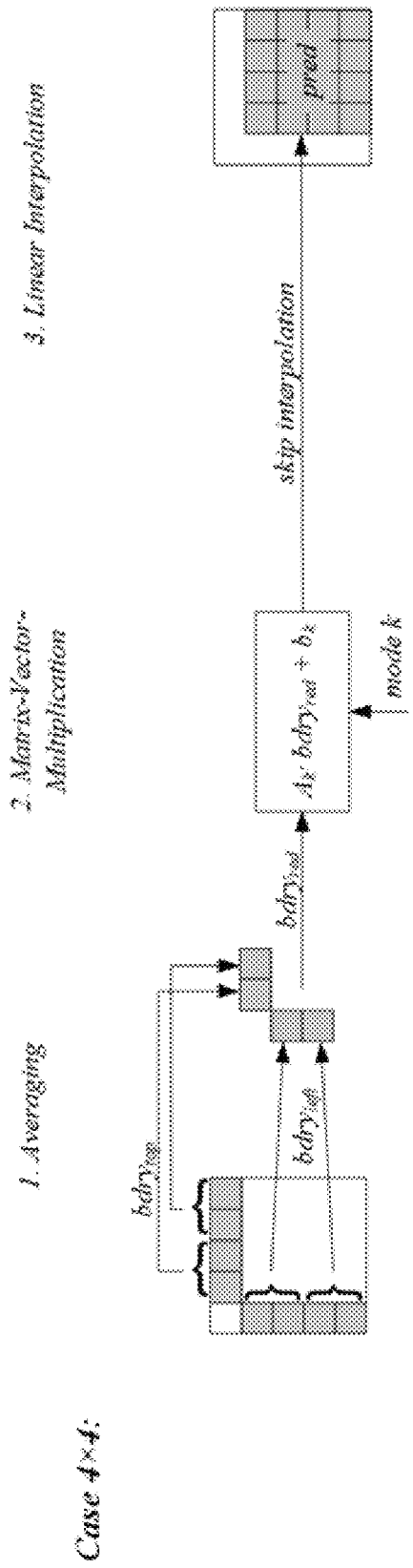
FIG. 9 is an illustration of ALWIP for 4×4 blocks.
Figure 10:
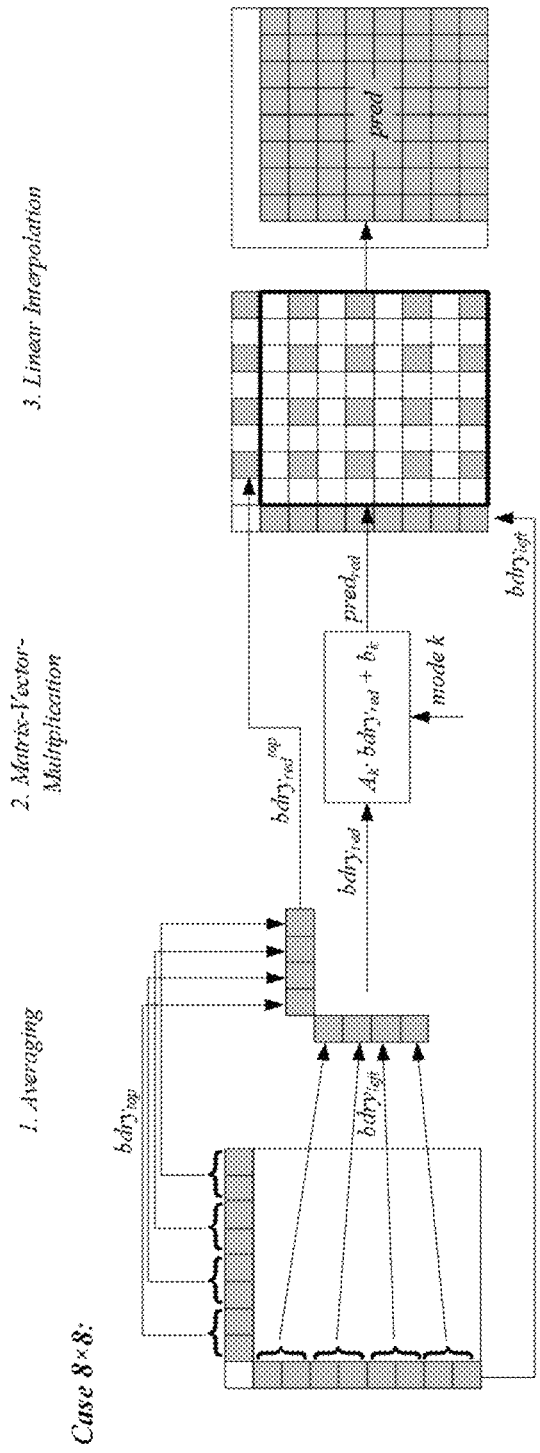
FIG. 10 is an illustration of ALWIP for 8×8 blocks.
Figure 11:
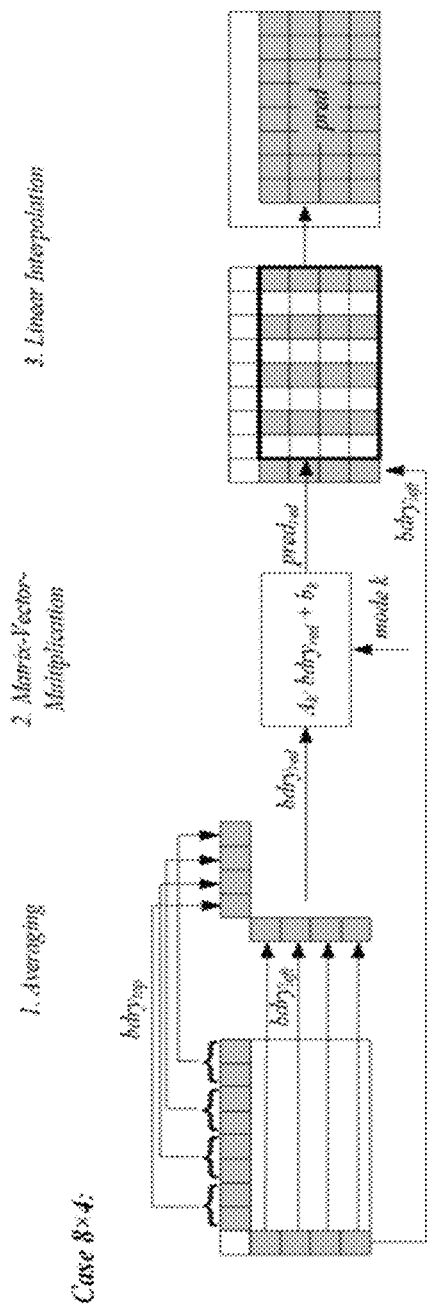
FIG. 11 is an illustration of ALWIP for 8×4 blocks.
Figure 12:
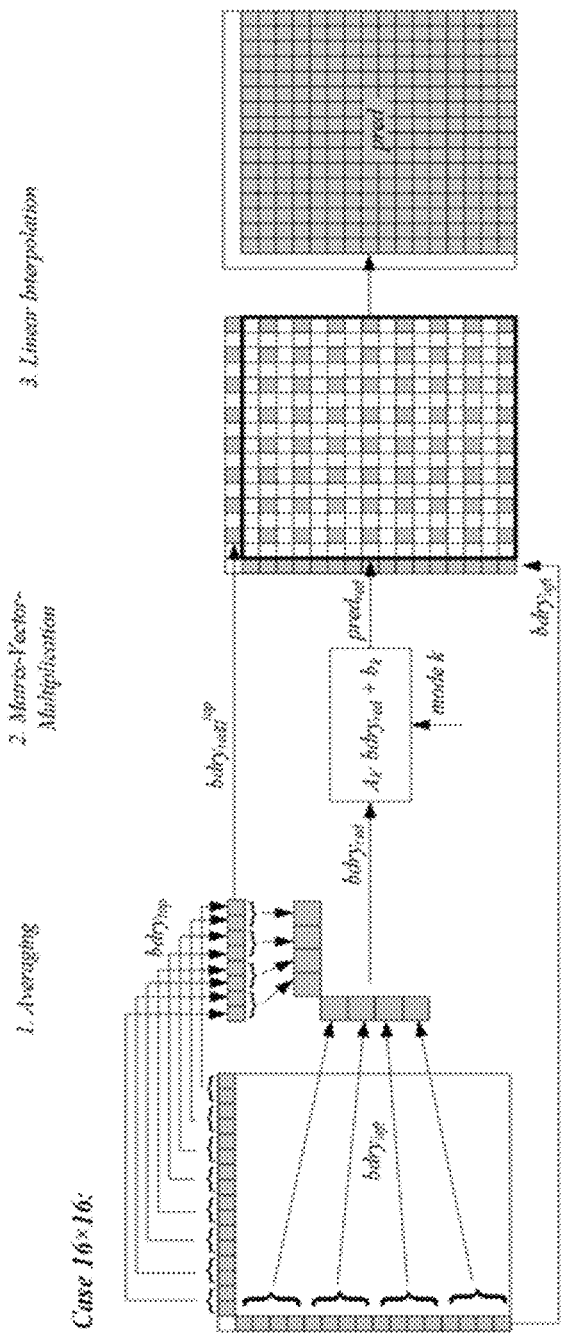
FIG. 12 is an illustration of ALWIP for 16×16 blocks.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIG. 8A-8B show examples of the two possibilities. All sub-partitions fulfill the condition of having at least 16 samples.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

2.2.6. Affine Linear Weighted Intra Prediction (ALWIP, a.k.a. Matrix Based Intra Prediction)

Affine linear weighted intra prediction (ALWIP, a.k.a. Matrix based intra prediction (MIP)) is proposed.

Two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.2.6.1. Test 1

For predicting the samples of a rectangular block of width W and height H, affine linear weighted intra prediction (ALWIP) takes one line of H reconstructed neighbouring boundary samples left of the block and one line of W reconstructed neighbouring boundary samples above the block as input. If the reconstructed samples are unavailable, they are generated as it is done in the conventional intra prediction.

The generation of the prediction signal is based on the following three steps:
1. Out of the boundary samples, four samples in the case of W=H=4 and eight samples in all other cases are extracted by averaging.
2. A matrix vector multiplication, followed by addition of an offset, is carried out with the averaged samples as an input. The result is a reduced prediction signal on a subsampled set of samples in the original block.
3. The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4×W×H. In other words, at most four multiplications per sample are required for the ALWIP modes.

2.2.6.2. Averaging of the Boundary

In a first step, the input boundaries $bdry^{top}$ and $bdry^{left}$ are reduced to smaller boundaries $bdry_{red}^{top}$ and $bdry_{red}^{left}$. Here, $bdry_{red}^{top}$ and $bdry_{red}^{left}$ both consists of 2 samples in the case of a 4×4-block and both consist of 4 samples in all other cases.

In the case of a 4×4-block, for $0 \le i < 2$, one defines $$bdry_{red}^{top}[i] = \left(\left(\sum_{j=0}^{1} bdry^{top}[i \cdot 2 + j]\right) + 1\right) \gg 1$$

and defines $bdry_{red}^{left}$ analogously.

Otherwise, if the block-width W is given as $W = 4 \cdot 2^k$, for $0 \le i < 4$, one defines $$bdry_{red}^{top}[i] = \left(\left(\sum_{j=0}^{2^k-1} bdry^{top}[i \cdot 2^k + j]\right) + (1 \ll (k-1))\right) \gg k$$

and defines $bdry_{red}^{left}$ analogously.

The two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and } mode < 18 \\ [bdry_{red}^{left}, bdry_{red}^{top}] & \text{for } W = H = 4 \text{ and } mode \ge 18 \\ [bdry_{red}^{top}, bdry_{red}^{left}] & \text{for } \max(W, H) = 8 \text{ and } mode < 10 \\ [bdry_{red}^{left}, bdry_{red}^{top}] & \text{for } \max(W, H) = 8 \text{ and } mode \ge 10 \\ [bdry_{red}^{top}, bdry_{red}^{left}] & \text{for } \max(W, H) > 8 \text{ and } mode < 6 \\ [bdry_{red}^{left}, bdry_{red}^{top}] & \text{for } \max(W, H) > 8 \text{ and } mode \ge 6. \end{cases}$$

Finally, for the interpolation of the subsampled prediction signal, on large blocks a second version of the averaged boundary is needed. Namely, if $\min(W,H) > 8$ and $W \ge H$, one writes $W = 8 \cdot 2^l$, and, for $0 \le i < 8$, defines $$bdry_{redII}^{top}[i] = \left(\left(\sum_{j=0}^{2^l-1} bdry^{top}[i \cdot 2^l + j]\right) + (1 \ll (l-1))\right) \gg l.$$

If $\min(W,H) > 8$ and $H > W$, one defines $bdry_{redII}^{left}$ analogously.

2.2.6.3. Generation of the Reduced Prediction Signal by Matrix Vector Multiplication Out of the reduced input vector $bdry_{red}$ one generates a reduced prediction signal $pred_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for } \max(W, H) \le 8 \\ \min(W, 8) & \text{for } \max(W, H) > 8 \end{cases}$$

$$H_{red} = \begin{cases} 4 & \text{for } \max(W, H) \le 8 \\ \min(W, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

The matrix A and the vector b are taken from one of the sets $S_0$, $S_1$, $S_2$ as follows. One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Moreover, one puts m as follows:

$$m = \begin{cases} mode & \text{for } W = H = 4 \text{ and } mode < 18 \\ mode - 17 & \text{for } W = H = 4 \text{ and } mode \geq 18 \\ mode & \text{for } \max(W, H) = 8 \text{ and } mode < 10 \\ mode - 9 & \text{for } \max(W, H) = 8 \text{ and } mode \geq 10 \\ mode & \text{for } \max(W, H) > 8 \text{ and } mode < 6 \\ mode - 5 & \text{for } \max(W, H) > 8 \text{ and } mode \geq 6. \end{cases}$$

Then, if idx≤1 or idx=2 and min(W,H)>4, one puts $A = A_{idx}^m$ and $b = b_{idx}^m$. In the case that idx=2 and min(W,H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block.

Finally, the reduced prediction signal is replaced by its transpose in the following cases:

W=H=4 and mode≥18 max(W,H)=8 and mode≥10 max(W,H)>8 and mode≥6

The number of multiplications required for calculation of $pred_{red}$ is 4 in the case of W=H=4 since in this case A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required, i.e. also in these cases, at most 4 multiplications per sample are needed to compute $pred_{red}$.

2.2.6.4. Illustration of the Entire ALWIP Process

The entire process of averaging, matrix vector multiplication and linear interpolation is illustrated for different shapes in FIGS. 9, 10, 11 and 12. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally, for W×4 blocks with W>8, let $A_k$ be the matrix that arises by leaving out every row that corresponds to an odd entry along the horizontal axis of the downsampled block.

Thus, the output size is 32 and again, only horizontal interpolation remains to be performed.

The transposed cases are treated accordingly.

In the following discussion, the boundary samples used to be multiplied with the matrix may be referred as "reduced boundary samples". The boundary samples used to interpolate the final prediction block from the down-sampled block may be referred as "upsampling boundary samples".

2.2.6.5. Single Step Linear Interpolation

For a W×H block with max(W,H)≥8, the prediction signal arises from the reduced prediction signal $pred_{red}$ on $W_{red} \times H_{red}$ by linear interpolation. Depending on the block shape, linear interpolation is done in vertical, horizontal or both directions. If linear interpolation is to be applied in both directions, it is first applied in horizontal direction if W<H and it is first applied in vertical direction, else.

Consider without loss of generality a W×H block with max(W,H)≥8 and W≥H. Then, the one-dimensional linear interpolation is performed as follows. Without loss of generality, it suffices to describe linear interpolation in vertical direction. First, the reduced prediction signal is extended to the top by the boundary signal. Define the vertical upsampling factor $U_{ver} = H/H_{red}$ and write $U_{ver} = 2^{u_{ver}} > 1$. Then, define the extended reduced prediction signal by $$pred_{red}[x][-1] = \begin{cases} bdry_{red}^{top}[x] & \text{for } W = 8 \\ bdry_{redII}^{top}[x] & \text{for } W > 8. \end{cases}$$

Then, from this extended reduced prediction signal, the vertically linear interpolated prediction signal is generated by $$pred_{red}^{ups,ver}[x][U_{ver} \cdot y + k] =$$

$$\left((U_{ver} - k - 1) \cdot pred_{red}[x][y-1] + (k+1) \cdot pred_{red}[x][y] + \frac{U_{ver}}{2}\right) \gg u_{ver}$$

-continued for $0 \leq x < W_{red}$, $0 \leq y < H_{red}$ and $0 \leq k < U_{ver}$.

2.2.6.6. Signalization of the Proposed Intra Prediction Modes

For each Coding Unit (CU) in intra mode, a flag indicating if an ALWIP mode is to be applied on the corresponding Prediction Unit (PU) or not is sent in the bitstream. The signalization of the latter index is harmonized with MRL. If an ALWIP mode is to be applied, the index predmode of the ALWIP mode is signaled using a MPM-list with 3 MPMS.

Here, the derivation of the MPMs is performed using the intra-modes of the above and the left PU as follows. There are three fixed tables map_angular_to_alwip$_{idx}$, idx∈{0,1,2} that assign to each conventional intra prediction mode predmode$_{Angular}$ an ALWIP mode predmode$_{ALWIP}$=map_angular_to_alwip$_{idx}$[predmode$_{Angular}$].

For each PU of width W and height H one defines an index idx(PU)=idx(W,H)∈{0,1,2} that indicates from which of the three sets the ALWIP-parameters are to be taken as in Section 2.2.6.3 above.

If the above Prediction Unit PU$_{above}$ is available, belongs to the same CTU as the current PU and is in intra mode, if idx(PU)=idx(PU$_{above}$) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in intra mode and if a conventional intra prediction mode predmode$_{Angular}^{above}$ is applied on the above PU, one puts mode$_{ALWIP}^{above}$=map_angular_to_alwip$_{idx(PU_{above})}$[predmode$_{Angular}^{above}$].

In all other cases, one puts mode$_{ALWIP}^{above}$=−1 which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx∈{0,1,2} are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting −1 by default values as well as eliminating repetitions.

The left neighbouring block and above neighbouring block used in the ALWIP MPM list construction is A1 and B1.

2.2.6.7. Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode$_{ALWIP}$ on a given PU to one of the conventional intra-prediction modes predmode$_{Angular}$=map_alwip_to_angular$_{idx(PU)}$[predmode$_{ALWIP}$].

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

2.3. Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.3.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.3.2. Merge Mode

2.3.2.1. Derivation of Candidates for Merge Mode

Figure 13:
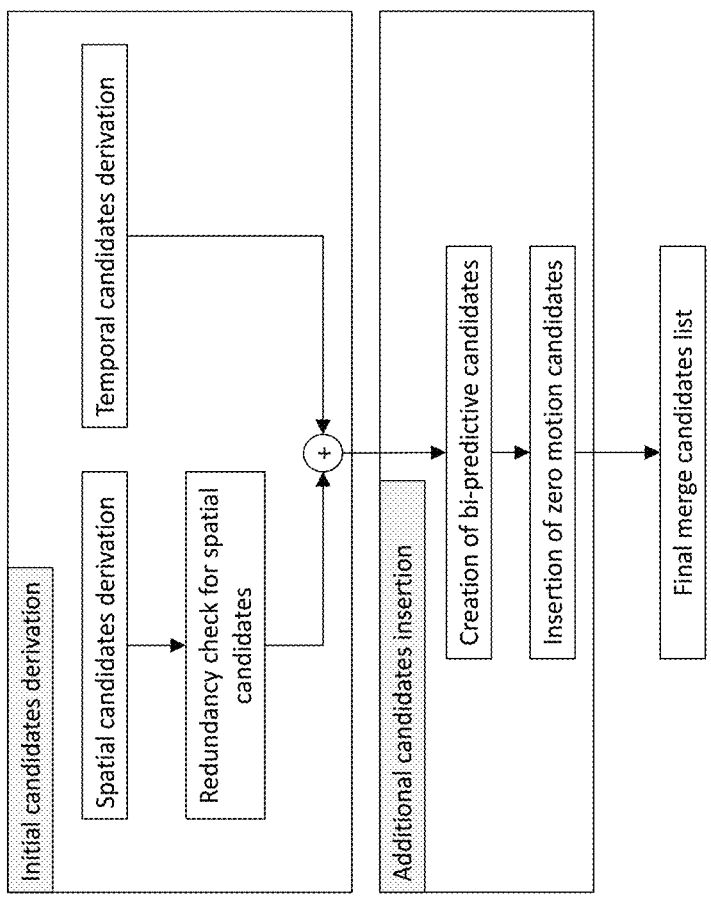
FIG. 13 is an example of derivation process for merge candidates list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
　　Step 1.1: Spatial candidates derivation
　　Step 1.2: Redundancy check for spatial candidates
　　Step 1.3: Temporal candidates derivation
Step 2: Additional candidates insertion
　　Step 2.1: Creation of bi-predictive candidates
　　Step 2.2: Insertion of zero motion candidates These steps are also schematically depicted in FIG. 13. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.3.2.2. Spatial Candidates Derivation

Figure 15:
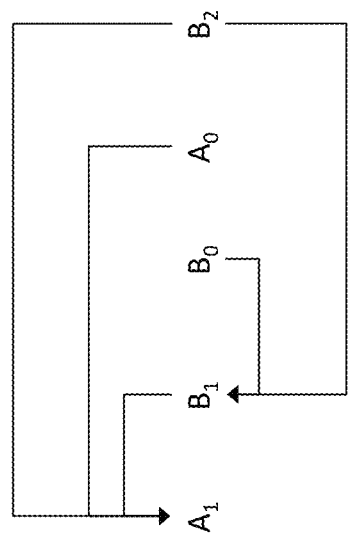
FIG. 15 show examples of candidate pairs considered for redundancy check of spatial merge candidates.
Figure 14:
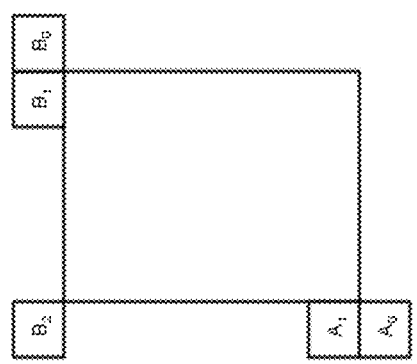
FIG. 14 shows example positions of spatial merge candidates.
Figure 16:
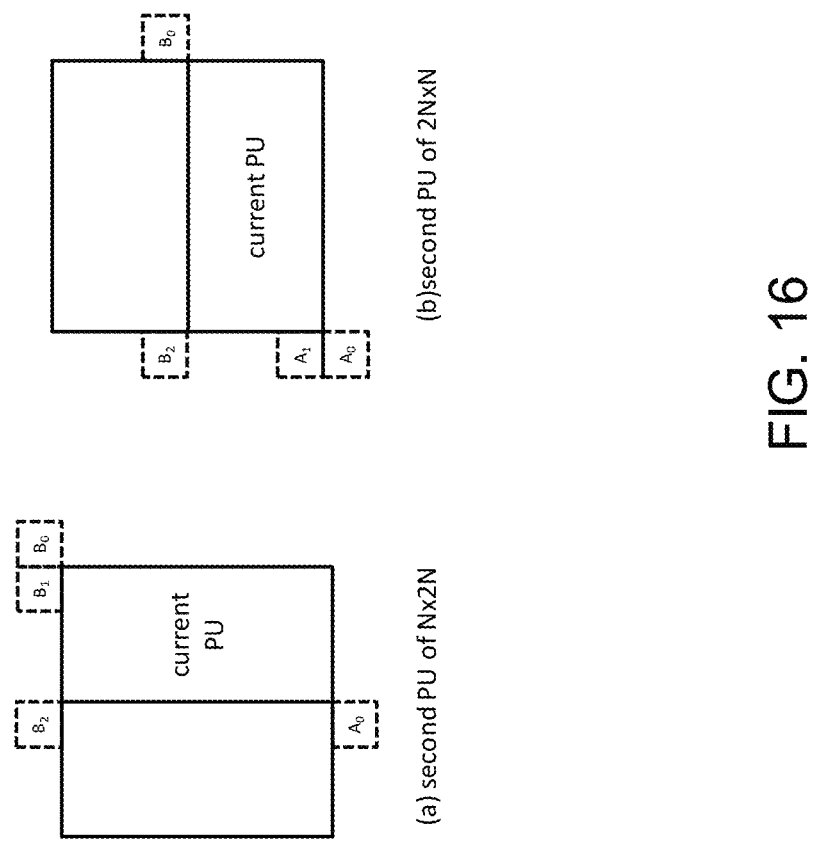
FIG. 16 shows examples of positions for the second PU of N×2N and 2N×N partitions.

In the derivation of spatial merge candidates, a maximum of four merge candidates are selected among candidates located in the positions depicted in FIG. 14. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 15 are considered and a candidate is only added to the list if the corresponding candidate used for redundancy check has not the same motion information. Another source of duplicate motion information is the "second PU" associated with partitions different from 2N×2N. As an example, FIG. 16 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.3.2.3. Temporal Candidates Derivation

Figure 17:
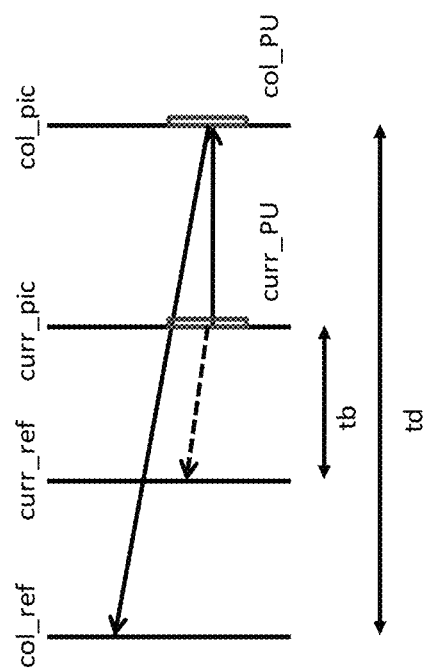
FIG. 17 is an illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 17, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 18:
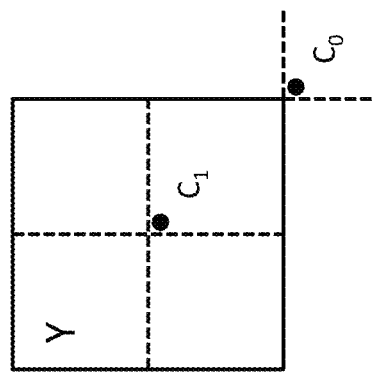
FIG. 18 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 18. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

2.3.2.4. Additional Candidates Insertion

Figure 19:
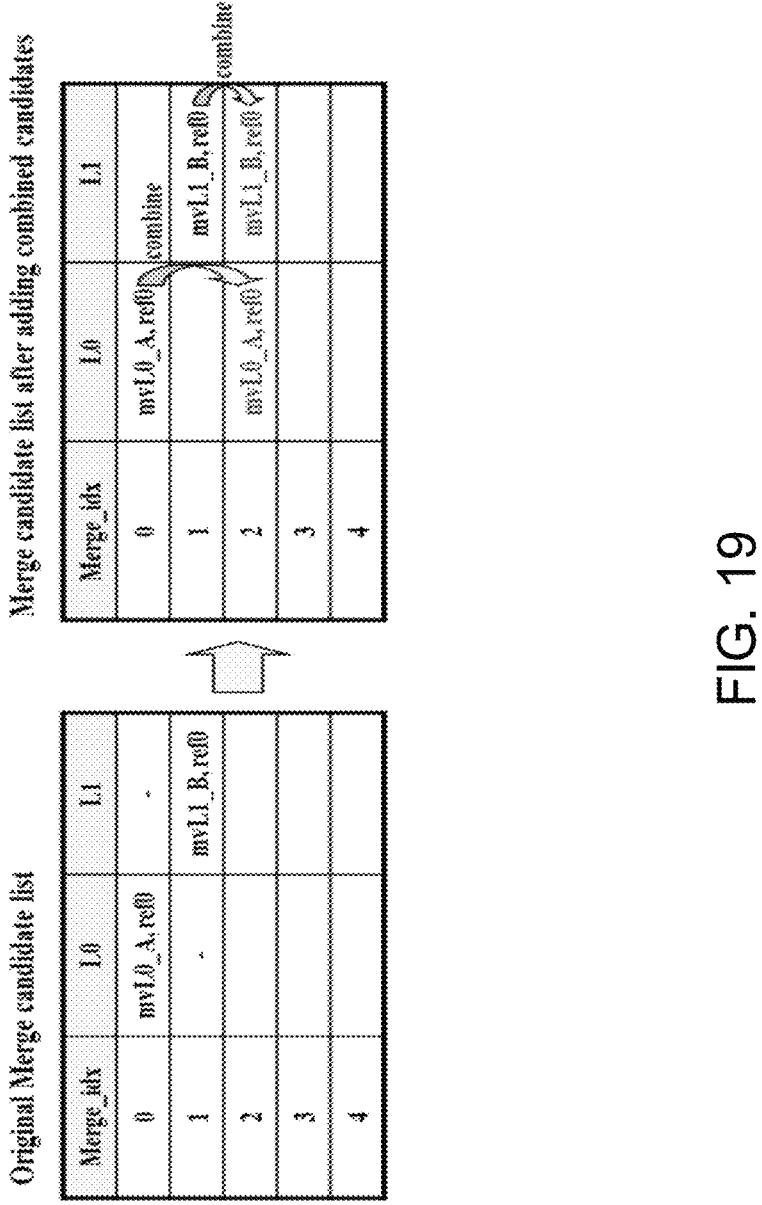
FIG. 19 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 19 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.3.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 20). In the following sections, details about derivation process of motion vector prediction candidate are provided.

2.3.3.1. Derivation of AMVP Candidates

Figure 20:
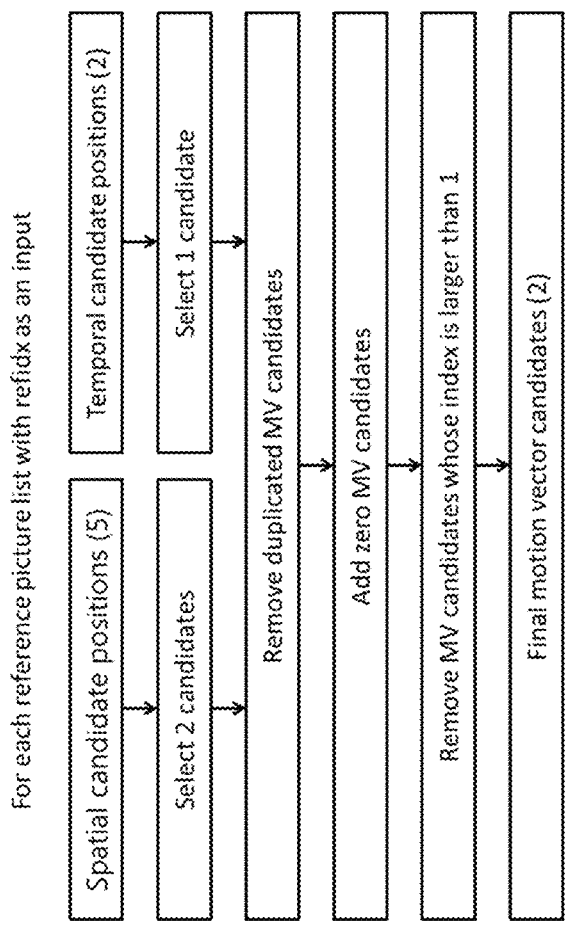
FIG. 20 shows an example of derivation process for motion vector prediction candidates.

FIG. 20 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 20.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.3.3.2. Spatial Motion Vector Candidates

In the derivation of spatial motion vector candidates, a maximum of two candidates are considered among five potential candidates, which are derived from PUs located in positions as depicted in FIG. 16, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No Spatial Scaling
  (1) Same reference picture list, and same reference picture index (same POC)
  (2) Different reference picture list, but same reference picture (same POC)

Spatial Scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 21:
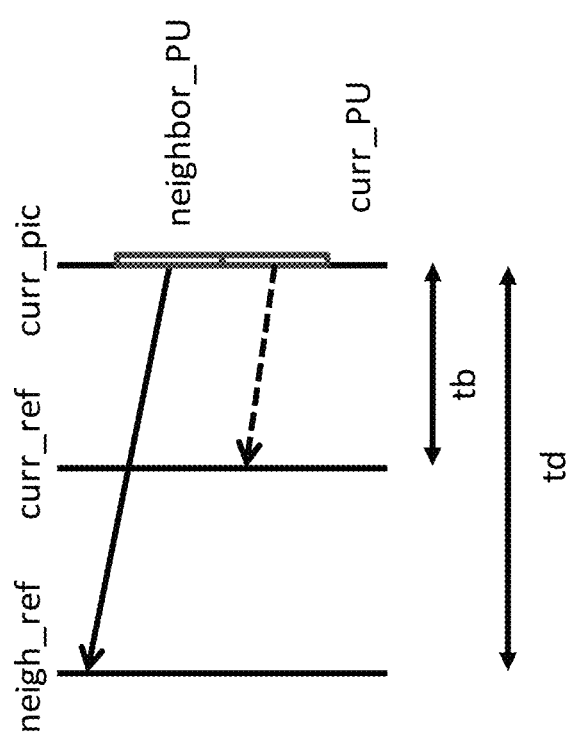
FIG. 21 is an illustration of motion vector scaling for spatial motion vector candidate.

In a spatial scaling process, the motion vector of the neighbouring PU is scaled in a similar manner as for temporal scaling, as depicted as FIG. 21. The main difference is that the reference picture list and index of current PU is given as input; the actual scaling process is the same as that of temporal scaling.

2.3.3.3. Temporal Motion Vector Candidates

Apart for the reference picture index derivation, all processes for the derivation of temporal merge candidates are the same as for the derivation of spatial motion vector candidates (see FIG. 20). The reference picture index is signalled to the decoder.

2.4. Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, TPM, CIIP rely on the regular merge list.

3) IBC merge list: it is done in a similar way as the regular merge list.

Similarly, there are three AMVP lists supported in VVC:
1) Affine AMVP candidate list
2) Regular AMVP candidate list
3) IBC AMVP candidate list: the same construction process as the IBC merge list 2.4.1. Coding Block Structure in VVC In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.4.2. Affine Prediction Mode

Figure 22B:
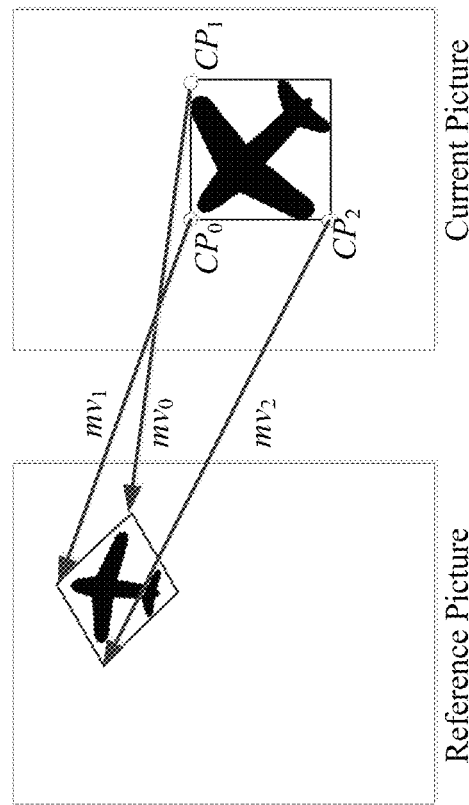
FIG. 22A-22B show examples of 4-parameter affine model and 6-parameter affine model, respectively.
Figure 22A:
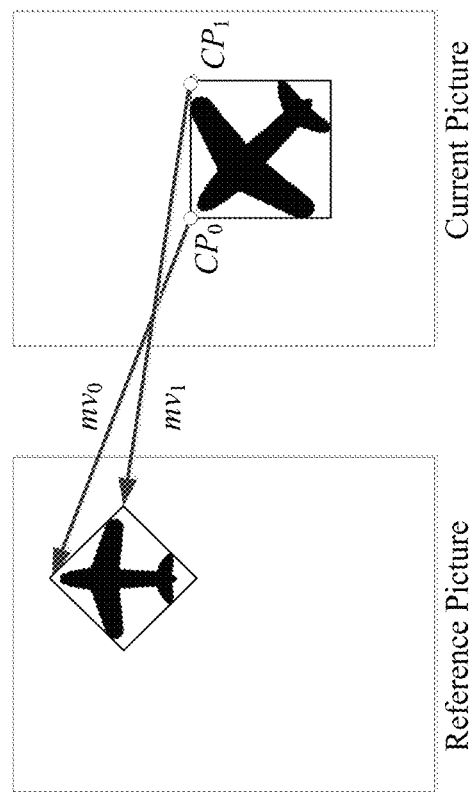

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 22, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h{}_0, mv^h{}_0)$ is motion vector of the top-left corner control point, and $(mv^h{}_1, mv^h{}_1)$ is motion vector of the top-right corner control point and $(mv^h{}_2, mv^h{}_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 23:
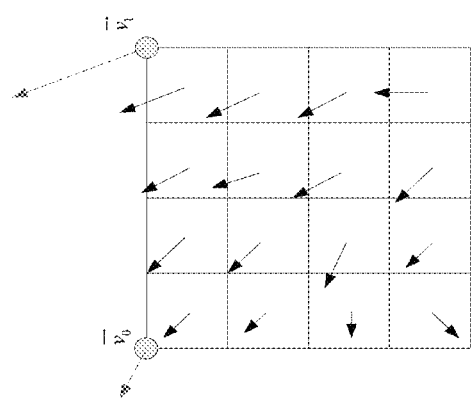
FIG. 23 shows an example of Affine MVF per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 23, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.4.3. MERGE for Whole Block 2.4.3.1. Merge List Construction of Translational Regular Merge Mode 2.4.3.1.1. History-Based Motion Vector Prediction (HMVP)

Different from the merge list design, in VVC, the history-based motion vector prediction (HMVP) method is employed.

Figure 24:
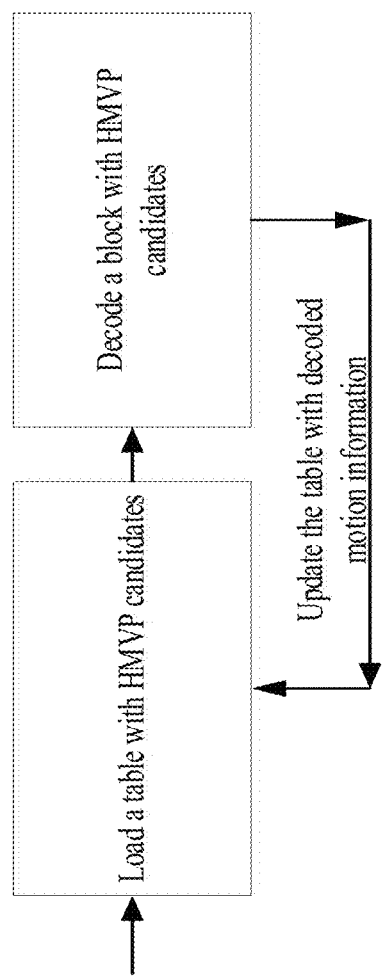
FIG. 24 shows a coding flow example for history based motion vector prediction.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 24.

2.4.3.1.2. Regular Merge List Construction Process

Figure 25:
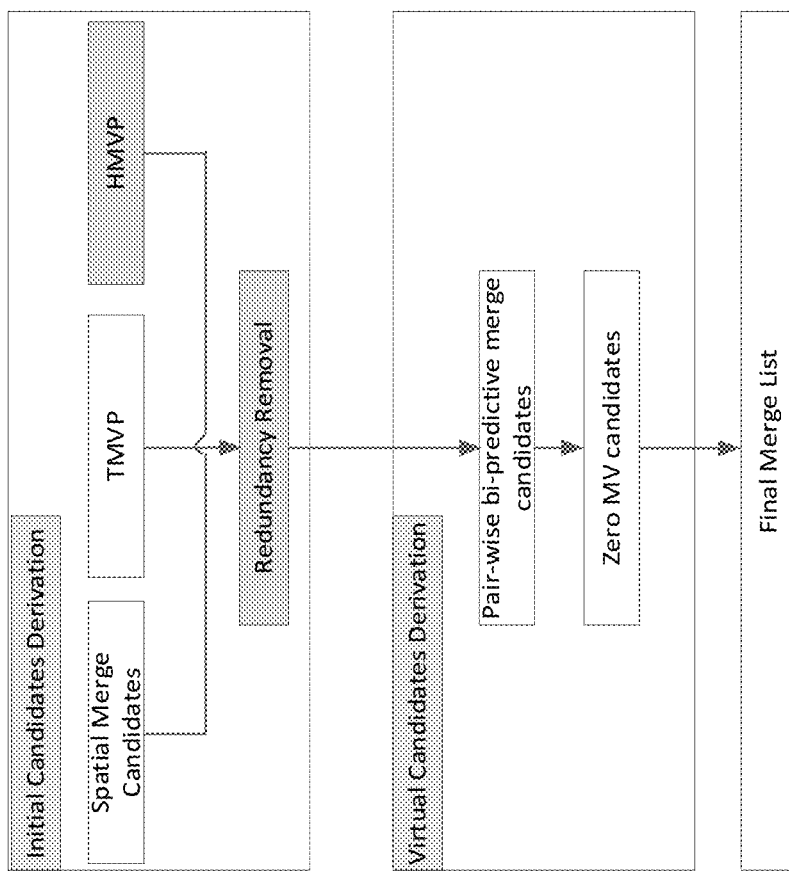
FIG. 25 shows an example of a merge candidate construction process.

The construction of the regular merge list (for translational motion) can be summarized according to the following sequence of steps:

Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 25 depicts a modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.4.3.2. Triangular Prediction Mode (TPM)

In VTM4, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

Figure 26:
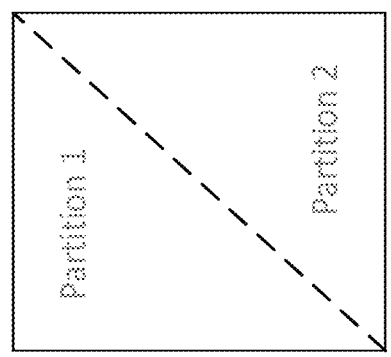
FIG. 26 shows an example of triangular partition based inter prediction mode.
Figure 26:
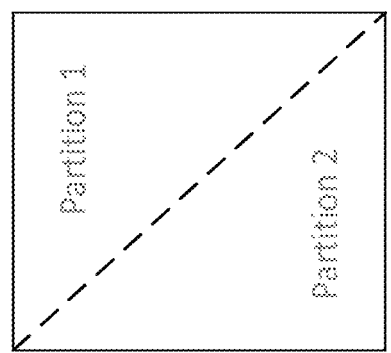
Figure 27:
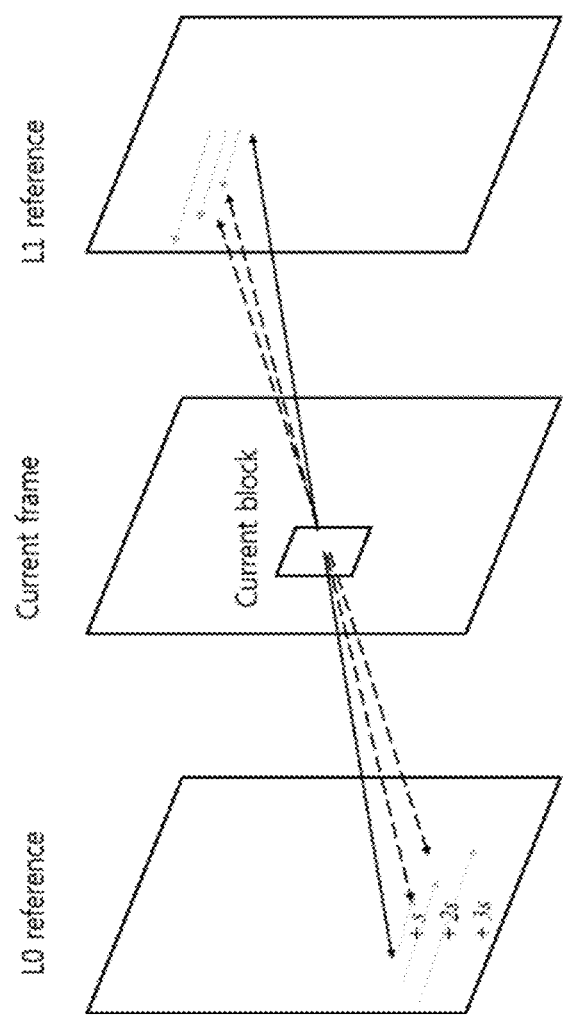
FIG. 27 shows an example of Ultimate Motion Vector Expression (UMVE) search.
Figure 28:
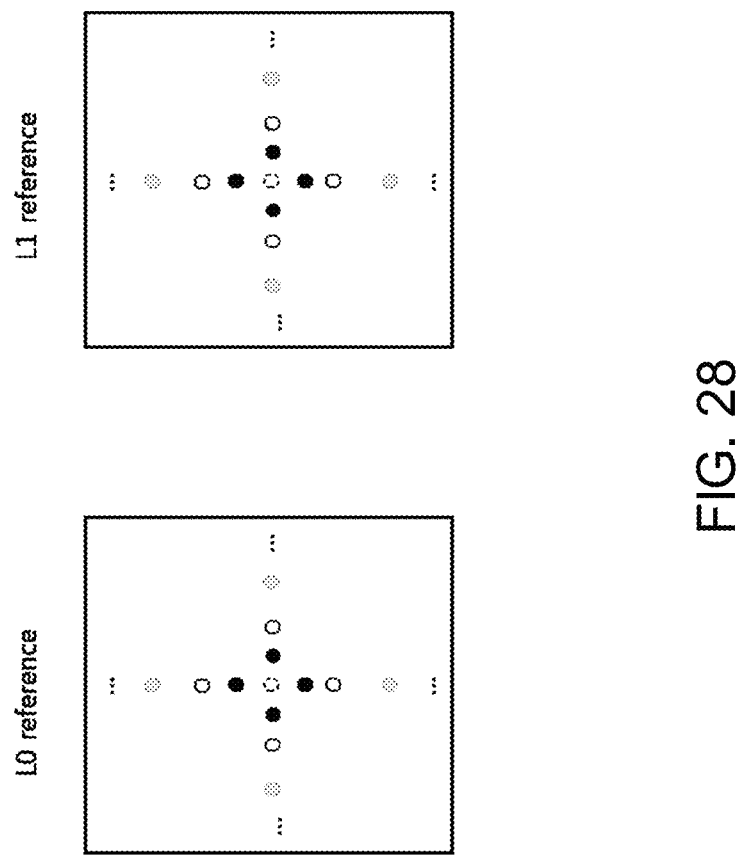
FIG. 28 shows examples of UMVE search points.

When this mode is used, a CU is split evenly into two triangle-shaped partitions, using either the diagonal split or the anti-diagonal split, as depicted in FIG. 26. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.4.3.3. MMVD

Ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 2

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 3

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 4

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.4.3.4. Combined Intra-Inter Prediction (CIIP)

Multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.4.4. MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
 a. ATMVP candidate (maybe available or unavailable);
 b. Affine merge lists (including Inherited Affine candidates; and Constructed Affine candidates)
 c. Padding as zero MV 4-parameter affine model 2.4.4.1.1. ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

2.4.5. Regular Inter Mode (AMVP)

2.4.5.1. AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.4.5.2. AMVR

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.4.5.3. Symmetric Motion Vector Difference

Symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.5. Multiple Transform Selection (MITS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table shows the basis functions of the selected DST/DCT.

TABLE 5

Transform basis functions of DCT-II/ VIII and DSTVII for N-point input

| Transform Type | Basis function $T_i(j)$, i, j = 0, 1, ..., N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 6. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 6

Transform and signalling mapping table

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| 1 | 0 | 1 | DCT8 | DST7 |
| 1 | 1 | 0 | DST7 | DCT8 |
| 1 | 1 | 1 | DCT8 | DCT8 |

As in HEVC, the residual of a block can be coded with transform skip mode. To avoid the redundancy of syntax coding, the transform skip flag is not signalled when the CU level MTS_CU_flag is not equal to zero. Transform skip is enabled when both block width and height are equal to or less than 4.

2.6. Intra Block Copy

Figure 29:
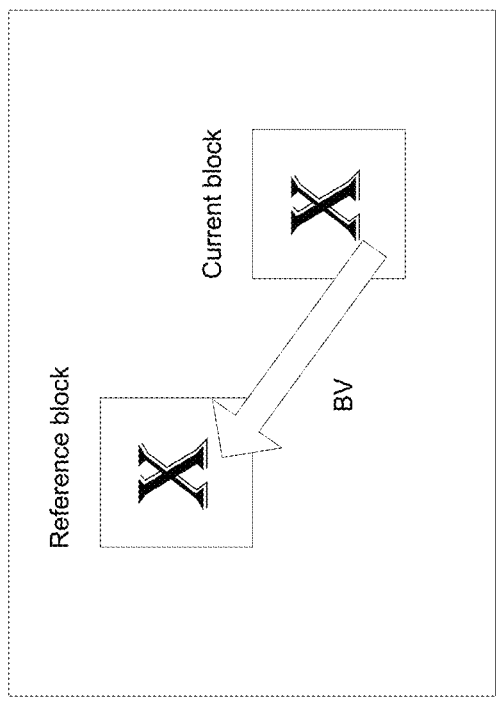
FIG. 29 is an illustration of intra block copy coding mode.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 29, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.6.1. IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.6.1.1. IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 14 in order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates. Finally, pairwise average candidates are inserted into the IBC merge list.

When a reference block identified by a merge candidate is outside of the picture, or overlaps with the current block, or outside of the reconstructed area, or outside of the valid area restricted by some constraints, the merge candidate is called invalid merge candidate.

It is noted that invalid merge candidates may be inserted into the IBC merge list.

2.6.1.2. IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.6.1.3. Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into $(N>>1)*(M>>1)$ sub blocks.
2) Each sub block with a top left sample coordinated at (x, y) fetches the corresponding luma block covering the same top-left sample which is coordinated at (2x, 2y).
3) The encoder checks the block vector (bv) of the fetched luma block. If one of the following conditions is satisfied, the bv is considered as invalid.
   a. A bv of the corresponding luma block is not existing.
   b. The prediction block identified by a bv is not reconstructed yet.
   c. The prediction block identified by a bv is partially or fully overlapped with the current block.
4) The chroma motion vector of a sub block is set to the motion vector of the corresponding luma sub block.

The IBC mode is allowed at the encoder when all sub blocks find a valid bv.

The decoding process of an IBC block is listed below. The part related to chroma mv derivation in a IBC mode is highlighted as grey.

8.6.1 General Decoding Process for Coding Units Coded in IBC Prediction

Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in ibc prediction mode consists of the following ordered steps:
  1. The motion vector components of the current coding unit are derived as follows:
     1. If treeType is equal to SINGLE_TREE or DUAL_TREE_LUMA, the following applies:
        The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
        When treeType is equal to SINGLE_TREE, the derivation process for chroma motion vectors in clause 8.6.2.9 is invoked with luma motion vector mvL[0][0] as input, and chroma motion vector mvC[0][0] as output.

The number of luma coding subblocks in horizontal direction numSbX and in vertical direction numSbY are both set equal to 1.

1. Otherwise, if treeType is equal to DUAL_TREE_CHROMA, the following applies:

The number of luma coding subblocks in horizontal direction numSbX and in vertical direction numSbY are derived as follows:

num*SbX*=(*cb*Width>>2)  (8-886)

num*SbY*=(*cb*Height>>2)  (8-887)

The chroma motion vectors mvC[xSbIdx][ySbIdx] are derived as follows for xSbIdx=0 . . . numSbX−1, ySbIdx=0 . . . numSbY−1:

The luma motion vector mvL[xSbIdx][ySbIdx] is derived as follows:

The location (xCuY, yCuY) of the collocated luma coding unit is derived as follows:

*xCuY*=*xCb*+*xSbIdx*\*4  (8 888)

*yCuY*=*yCb*+*ySbIdx*\*4  (8 889)

If CuPredMode[xCuY][yCuY] is equal to MODE_INTRA, the following applies.

*mvL*[*xSbIdx*][*ySbIdx*][0]=0  (8 890)

*mvL*[*xSbIdx*][*ySbIdx*][1]=0  (8 891)

predFlag*L*0[*xSbIdx*][*ySbIdx*]=0  (8 892)

predFlag*L*1[*xSbIdx*][*ySbIdx*]=0  (8 893)

Otherwise (CuPredMode[xCuY][yCuY] is equal to MODE_IBC), the following applies:

*mvL*[*xSbIdx*][*ySbIdx*][0]=*MvL*0[*xCuY*][*yCuY*][0]  (8 894)

*mvL*[*xSbIdx*][*ySbIdx*][1]=*MvL*0[*xCuY*][*yCuY*][1]  (8 895)

predFlag*L*0[*xSbIdx*][*ySbIdx*]=1  (8 896)

predFlag*L*1[*xSbIdx*][*ySbIdx*]=0  (8 897)

The derivation process for chroma motion vectors in clause 8.6.2.9 is invoked with mvL[xSbIdx][ySbIdx] as inputs, and mvC[xSbIdx][ySbIdx] as output.

It is a requirement of bitstream conformance that the chroma motion vector mvC[xSbIdx][ySbIdx] shall obey the following constraints:

When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.

When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.

One or both of the following conditions shall be true:

(mvC[xSbIdx][ySbIdx][0]>>5)+xSbIdx*2+2 is less than or equal to 0.

(mvC[xSbIdx][ySbIdx][1]>>5)+ySbIdx*2+2 is less than or equal to 0.

2. The prediction samples of the current coding unit are derived as follows:

If treeType is equal to SINGLE_TREE or DUAL_TREE_LUMA, the prediction samples of the current coding unit are derived as follows:

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamplesL of prediction luma samples as outputs.

Otherwise if treeType is equal to SINGLE_TREE or DUAL_TREE_CHROMA, the prediction samples of the current coding unit are derived as follows:

The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array predSamples$_{Cb}$ of prediction chroma samples for the chroma components Cb as outputs.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.
4. The residual samples of the current coding unit are derived as follows:
   When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.
   When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.
   When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.
5. The reconstructed samples of the current coding unit are derived as follows:
   When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamplesL and the (cbWidth)×(cbHeight) array resSamples set equal to resSamples$_L$ as inputs, and the output is a modified reconstructed picture before in-loop filtering.
   When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.
   When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.6.2. Recent Progress for IBC (in VTM5.0)
2.6.2.1. Single BV List

The BV predictors for merge mode and AMVP mode in IBC will share a common predictor list, which consist of the following elements:
   2 spatial neighboring positions (A1, B1 as in FIG. 14)
   5 HMVP entries
   Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, it also proposed to simplify the pruning operations between HMVP candidates and the existing merge candidates (A1, B1). In the simplification there will be up to 2 pruning operations since it only compares the first HMVP candidate with spatial merge candidate(s).

2.6.2.1.1. Decoding Process
8.6.2.2 Derivation Process for IBC Luma Motion Vector Prediction This process is only invoked when CuPredMode[xCb][yCb] is equal to MODE_IBC, where (xCb, yCb) specify the top-left sample of the current luma coding block relative to the top-left luma sample of the current picture.

Inputs to this process are:
   a luma location (xCb, yCb) of the top-left sample of the current luma coding block relative to the top-left luma sample of the current picture,
   a variable cbWidth specifying the width of the current coding block in luma samples,
   a variable cbHeight specifying the height of the current coding block in luma samples.

Outputs of this process are:
   the luma motion vectors in 1/16 fractional-sample accuracy mvL.

The variables xSmr, ySmr, smrWidth, smrHeight, and smrNumHmvpIbcCand are derived as follows:

$$xSmr = IsInSmr[xCb][yCb]\,?\,SmrX[xCb][yCb]:xCb \quad (8\text{-}910)$$

$$ySmr = IsInSmr[xCb][yCb]\,?\,SmrY[xCb][yCb]:yCb \quad (8\text{-}911)$$

$$smrWidth = IsInSmr[xCb][yCb]\,?\,SmrW[xCb][yCb]:cbWidth \quad (8\text{-}912)$$

$$smrHeight = IsInSmr[xCb][yCb]\,?\,SmrH[xCb][yCb]:cbHeight \quad (8\text{-}913)$$

$$smrNumHmvpIbcCand = IsInSmr[xCb][yCb]\,?\,NumHmvpSmrIbcCand:NumHmvpIbcCand \quad (8\text{-}914)$$

The luma motion vector mvL is derived by the following ordered steps:
1. The derivation process for spatial motion vector candidates from neighbouring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlagA$_1$, availableFlagB$_1$ and the motion vectors mvA$_1$ and mvB$_1$.

2. The motion vector candidate list, mvCandList, is constructed as follows:

$i=0$ if(availableFlag$A_1$)

$mv$CandList[$i$++]=$mvA_1$ if(availableFlag$B_1$)

$mv$CandList[$i$++]=$mvB_1$         (8-915)

3. The variable numCurrCand is set equal to the number of merging candidates in the mvCandList.
4. When numCurrCand is less than MaxNumMergeCandand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.
5. When numCurrCand is less than MaxNumMergeCand, the following applies until numCurrCand is equal to MaxNumMergeCand:
  1. mvCandList[numCurrCand][0] is set equal to 0.
  2. mvCandList[numCurrCand][1] is set equal to 0.
  3. numCurrCand is increased by 1.
6. The variable mvIdx is derived as follows:

mvIdx=general_merge_flag[$xCb$][$yCb$]?merge_idx
   [$xCb$][$yCb$]:mvp_10_flag[$xCb$][$yCb$]     (8-916)

7. The following assignments are made:

mvL[0]=mergeCandList[$mvIdx$][0]     (8-917)

mvL[1]=mergeCandList[$mvIdx$][1]     (8-918)

2.6.2.2. Size restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.6.2.3. Shared Merge List for IBC

To reduce the decoder complexity and support parallel encoding, it proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
If the block has luma samples no larger than 32, and split to 2 4×4 child blocks, sharing merge lists between very small blocks (e.g. two adjacent 4×4 blocks) is used.
If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

2.6.3. Quantized Residual Differential Pulse Coded Modulation (RDPCM)

VTM5 supports quantized residual differential pulse coded modulation (RDPCM) for screen content coding.

When RDPCM is enabled, a flag is transmitted at the CU level if the CU size is smaller than or equal to 32×32 luma samples and if the CU is intra coded. This flag indicates whether regular intra coding or RDPCM is used. If RDPCM is used, a RDPCM prediction direction flag is transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on the RDPCM prediction direction) neighbouring position, is coded.

For a block of size M (height)×N (width), let $r_{i,j}$, $0 \le i \le M-1$, $0 \le j \le N-1$ be the prediction residual. Let $Q(r_{i,j})$, $0 \le i \le M-1$, $0 \le j \le N-1$ denote the quantized version of the residual $r_{i,j}$. RDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical RDPCM prediction mode, for $0 \le j \le (N-1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases} \quad (3-3)$$

For horizontal RDPCM prediction mode, for $0 \le i \le (M-1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases} \quad (3-4)$$

At the decoder side, the above process is reversed to compute $Q(r_{i,j})$, $0 \le i \le M-1$, $0 \le j \le N-1$, as follows:

$Q(r_{i,j}) = \Sigma_{k=0}^{i} \tilde{r}_{k,j}$, if vertical RDPCM is used   (3-5)

$Q(r_{i,j}) = \Sigma_{k=0}^{j} \tilde{r}_{i,k}$, if horizontal RDPCM is used   (3-6)

The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. In terms of the MPM mode for future intra mode coding, because no luma intra mode is coded for a RDPCM-coded CU, the first MPM intra mode is associated with the current CU and used for intra mode coding of the chroma blocks of the current CU and subsequent CUs. For deblocking, if both blocks on the sides of a block boundary are coded using RDPCM, then that particular block boundary is not deblocked.

2.7. Combined Inter and Intra Prediction (CIIP)

Figure 30:
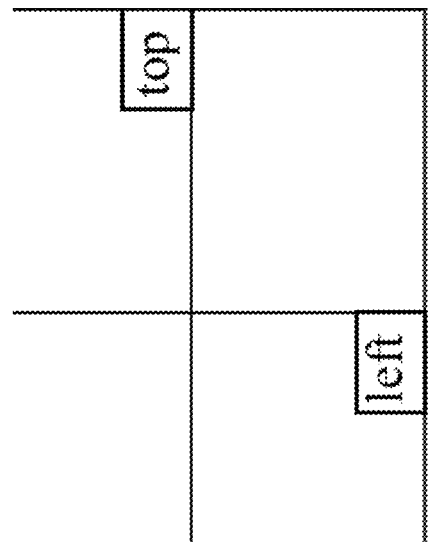
FIG. 30 shows an example of Top and left neighboring blocks used in CIIP weight derivation.

In VTM5, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 30) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraTop+isIntraLeft) is equal to 2, then wt is set to 3;
Otherwise, if (isIntraTop+isIntraLeft) is equal to 1, then wt is set to 2;
Otherwise, set wt to 1.

The CIIP prediction is formed as follows:

$$P_{CIIP}((4-wt)*P_{inter}+wt*P_{intra}+2)>>2 \quad (3-7)$$

3. Technical Problems Solved by Technical Solutions Provided in the Present Document The current VVC design may have the following problems:
1. When consider motion information in some coding tools, e.g. TPM, RDPCM, CIIP, coding efficiency for screen content coding could be improved.
2. Motion/block vector coding for IBC mode might not be efficient.

4. A Listing of Techniques and Embodiments

The listing below should be considered as examples to explain general concepts. These techniques should not be interpreted in a narrow way. Furthermore, these inventions can be combined in any manner.

In the following, "block vector" represents the motion vector which points to a reference block within the same picture. "IBC" represents a coding method which utilize the information of samples (filtered or un-filtered) in the same picture. For example, if one block is coded with two reference pictures, one of them is the current picture and the other not, in such case, it may be also classified to be coded with the IBC mode.

In the following, we denote MVx and MVy as the horizontal and vertical components of a motion vector (MV); MVDx and MVDy as the horizontal and vertical components of a motion vector difference (MVD); BVx and BVy as the horizontal and vertical components of a block vector (BV); BVPx and BVPy as the horizontal and vertical components of a block vector predictor (BVP); BVDx and BVDy as the horizontal and vertical components of a block vector difference (BVD). CBx and CBy stand for the position of a block relative to the upper-left position of a picture; W and H stand for the width and height of the block. (x, y) denotes a sample relative to the upper-left position of a block. Floor(t) is the largest integer no larger than t.

Figure 31:
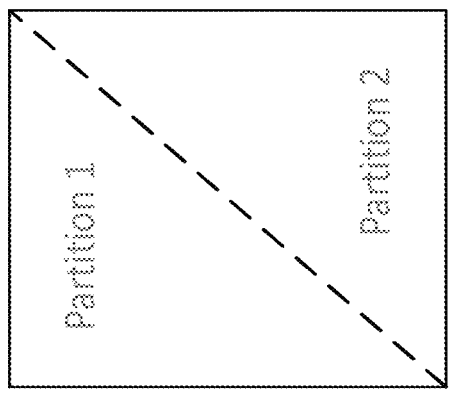
FIG. 31 shows partitioning of a video block.
Figure 31:
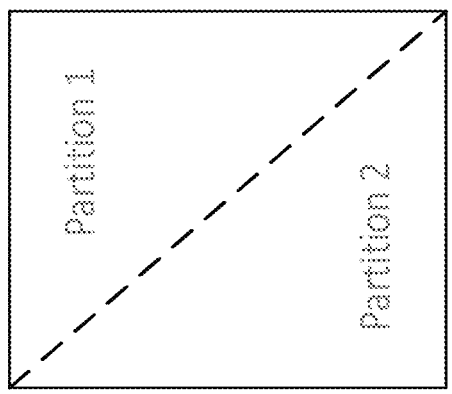

1. It is proposed to modify block vector differences (e.g., the differences between the block vector and a block vector predictor) for IBC-coded blocks and the modified BVD is coded.
    a. In one example, BVDy may be modified to (BVDy+ BH), where BH is a constant.
        i. In one example, BH may be 128.
        ii. In one example, BH may be −128.
        iii. In one example, BH may be the height of a CTU.
        iv. In one example, BH may be minus the height of a CTU.
        v. In one example, BH may depend on the block dimension and/or block position and/or IBC reference region sizes.
    b. In one example, BVDx may be modified to (BVDx+ BW), where BW is a constant.
        i. In one example, BW may be 128.
        ii. In one example, BW may be −128.
        iii. In one example, BW may be 128*128/(CTU/CTB size).
        iv. In one example, BW may be minus 128*128/ (CTU/CTB size).
        v. In one example, BW may depend on the block dimension and/or block position and/or IBC reference region sizes.
    c. In one example, such modification may be performed for certain BVD value set BVDS1, and may not be performed for certain BVD value setBVDS2, and a syntax may be signaled for all other BVD values to indicate whether such modification is applied or not.
    d. Whether to and/or how to modify block vector difference may depend on the sign and/or magnitude of the difference.
        i. In one example, when BVDy>BH/2, BVDy might be modified to (BVDy−BH).
        ii. In one example, when BVDy<−BH/2, BVDy might be modified to (BVDy+BH).
        iii. In one example, when BVDx>BW/2, BVDx might be modified to (BVDx−BW).
        iv. In one example, when BVDx<−BH/2, BVDx might be modified to (BVDx+BW).
2. It is proposed to modify block vector predictors for IBC-coded blocks and the modified BV predictors is used for decoding the blocks.
    a. In one example, the modified BV predictors may be used together with the signaled BVDs to derive the final BV for the block (e.g., in the AMVP mode).
    b. In one example, the modified BV predictors may be directly used as the final BV for the block (e.g., in the merge mode).
    c. The modification of BV predictors may be done in a similar way as bullet 1 by replacing BVD by BVP.
    d. Whether to and/or how to modify BVP may depend on the sign and/or magnitude of the BVP.
        i. In one example, when BVPy=BVPx=0, (BVPx, BVPy) may be modified to (−64, −64).
3. It is proposed to modify decoded block vectors for IBC and the modified block vectors are used to identify reference blocks, e.g., used for sample copying.
    a. In one example, BVy may be modified to (BVy+BH) when it is used.
        i. In one example, BH may be 128.
        ii. In one example, BH may be −128.
        iii. In one example, BH may be the height of a CTU/CTB.
        iv. In one example, BH may be minus the height of a CTU/CTB.
        v. In one example, BH may depend on the block dimension and/or block position and/or IBC reference region sizes.
    b. In one example, BVx may be modified to (BVx+ BW) when it is used.
        i. In one example, BW may be 128.
        ii. In one example, BW may be −128.

iii. In one example, BW may be 128*128/(CTU/CTB size).
iv. In one example, BW may be minus 128*128/(CTU/CTB size).
v. In one example, BW may depend on the block dimension and/or block position and/or IBC reference region sizes.
c. In one example, the motion vector after the above modifications may be need to be valid.
i. In one example, a valid motion vector may be corresponding to a prediction block not overlapped with the current block.
ii. In one example, a valid motion vector may be corresponding to a prediction block inside the current picture.
iii. In one example, a valid motion vector may be corresponding to a prediction block with all samples reconstructed.
d. In one example, the modified block vectors may be stored and used for motion prediction or/and deblocking.
e. Whether to and/or how to modify block vector may depend on the magnitude of a component.
i. In one example, when (CBy+BVy)/(CTU/CTB height)<CBy/(CTU/CTB height), BVy might be modified to (BVy+(CTU/CTB height)).
ii. In one example, when (CBy+W+BVy)/(CTU/CTB height)>CBy/(CTU/CTB height), BVy might be modified to (BVy−(CTU/CTB height)).
iii. In one example, when (BVx, BVy) is invalid, BVx might be modified to (BVx+BW) if block vector (BVx−BW, BVy) is valid, where BVy might be unmodified or modified vertical component.
iv. In one example, when (BVx, BVy) is invalid, BVx might be modified to (BVx+BW) if block vector (BVx+BW, BVy) is valid, where BVy might be unmodified or modified vertical component.
4. The modifications for different components may follow an order.
a. In one example, modification to BVDx may before modification to BVDy.
b. In one example, BVy may be modified before modification to BVx.
5. Motion vector predictors may be formed based on modified BV/BVD
a. In one example, HMVP may be based on the modified BV/BVD.
b. In one example, merge candidates may be based on the modified BV/BVD.
c. In one example, AMVP may be based on the modified BV/BVD.
6. The above constant values BW, BH may be predefined, or signalled in SPS/PPS/Slice/Tile group/Tile/Brick/CTU level.
7. The above methods may be disabled when a current block located on a picture/Slice/Tile group/boundary.
a. In one example, BH may be set to 0 when the vertical position of current block relative to the most top left of a picture/Slice/Tile group is 0.
b. In one example, BW may be set to 0 when the horizontal position of current block relative to the most top left position of a picture/Slice/Tile group is 0.
8. The weighting factor applied to intra prediction signal, denoted by wt, in CIIP may depend on motion vector.
a. In one example, when MVx is equal to 0 or MVy is equal to 0, wt for intra prediction may be set to 1.
b. In one example, when MV is pointing to integer-pel, or with integer precision, wt for intra prediction may be set to 1.
9. The weights used in TPM may depend on motion information of a partition.
a. In one example, it may be dependent on whether the MVs associated with one partition has one or multiple components (horizontal or/and vertical) is equal to 0.
b. In one example, when MVx is equal to 0 or MVy is equal to 0 for the upper-right partition in TPM, i.e., partition 1 shown in FIG. 31A, and W>=H, weights for samples satisfying floor(x*H/W)<=y may be set to 1.
i. Alternatively, for other samples, the weights may be set to 0.
c. In one example, when MVx is equal to 0 or MVy is equal to 0 for the upper-right partition in TPM, i.e., partition 1 shown in FIG. 31A, and W<H, weights for samples satisfying x<=floor(y*W/H) may be set to 1.
i. Alternatively, for other samples, the weights may be set to 0.
d. In one example, when MVx is equal to 0 or MVy is equal to 0 for the bottom-left partition in TPM, i.e., partition 2 shown in FIG. 31A, and W>=H, weights for samples satisfying floor(x*H/W)>=y may be set to 1.
i. Alternatively, for other samples, the weights may be set to 0.
e. In one example, when MVx is equal to 0 or MVy is equal to 0 for the bottom-left partition in TPM, i.e., partition 2 shown in FIG. 31A, and W<H, weights for samples satisfying x>=floor(y*W/H) may be set to 1.
i. Alternatively, for other samples, the weights may be set to 0.
f. In one example, when MVx is equal to 0 or MVy is equal to 0 for the upper-left partition in TPM, i.e., partition 1 shown in FIG. 31B, and W>=H, weights for samples satisfying floor((W−1−x)*H/W)>=y may be set to 1.
i. Alternatively, for other samples, the weights may be set to 0.
g. In one example, when MVx is equal to 0 or MVy is equal to 0 for the upper-left partition in TPM, i.e., partition 1 shown in FIG. 31B, and W<H, weights for samples satisfying (W−1−x)>=floor(y*W/H) may be set to 1.
i. Alternatively, for other samples, the weights may be set to 0.
h. In one example, when MVx is equal to 0 or MVy is equal to 0 for the bottom-right partition in TPM, i.e., partition 2 shown in FIG. 31B, and W>=H, weights for samples satisfying floor((W−1−x)*H/W)<=y may be set to 1.
i. Alternatively, for other samples, the weights may be set to 0.
i. In one example, when MVx is equal to 0 or MVy is equal to 0 for the bottom-right partition in TPM, i.e., partition 2 shown in FIG. 31B, and W<H, weights for samples satisfying (W−1−x)<=floor(y*W/H) may be set to 1.
i. Alternatively, for other samples, the weights may be set to 0.

Figure 32:
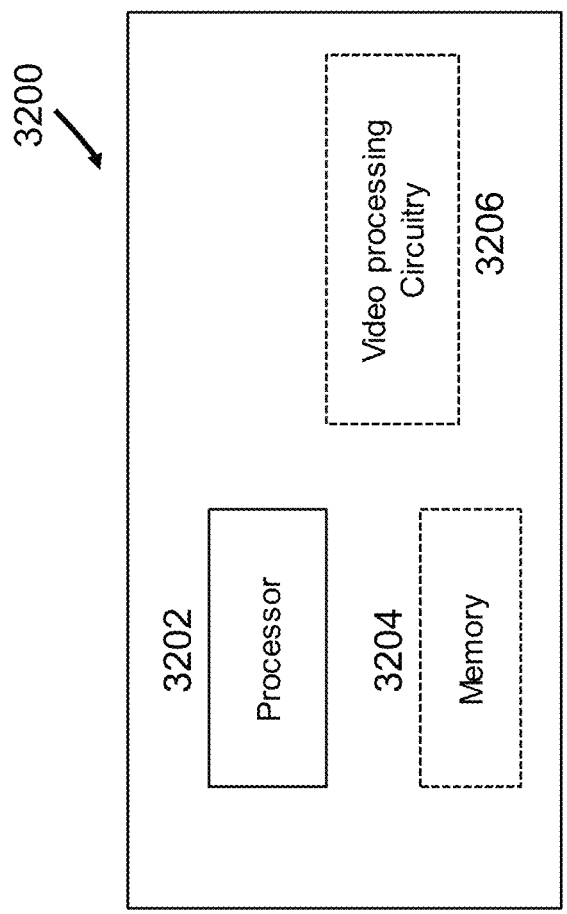
FIG. 32 is a block diagram of an example apparatus for video processing.

10. The blending process in TPM may depend on the transform information.
    a. In one example, when transform skip mode is selected, the blending process may not be applied.
    b. In one example, when the block has no non-zero residual, the blending process may not be applied.
    c. In one example, when transform is selected, the blending process may be applied.
    d. In one example, when the blending process is not applied, the prediction sample of partition X may be generated only using the motion information of that partition, wherein X may be 0 or 1.
11. Whether to enable above methods may depend on
    a. The characteristics of the coded content.
    b. Content type (e.g., screen content, camera-captured content)
    c. A flag at SPS/PPS/Slice/Tile group/Tile/Brick/CTU/other video unit level.
    d. Coded information of one block FIG. 32 is a block diagram of a video processing apparatus 3200. The apparatus 3200 may be used to implement one or more of the methods described herein. The apparatus 3200 may be embodied in a smartphone, tablet, computer, Internet of Things (IoT) receiver, and so on. The apparatus 3200 may include one or more processors 3202, one or more memories 3204 and video processing hardware 3206. The processor(s) 3202 may be configured to implement one or more methods described in the present document. The memory (memories) 3204 may be used for storing data and code used for implementing the methods and techniques described herein. The video processing hardware 3206 may be used to implement, in hardware circuitry, some techniques described in the present document.

In some embodiments, the video coding methods may be implemented using an apparatus that is implemented on a hardware platform as described with respect to FIG. 32.

Figure 33:
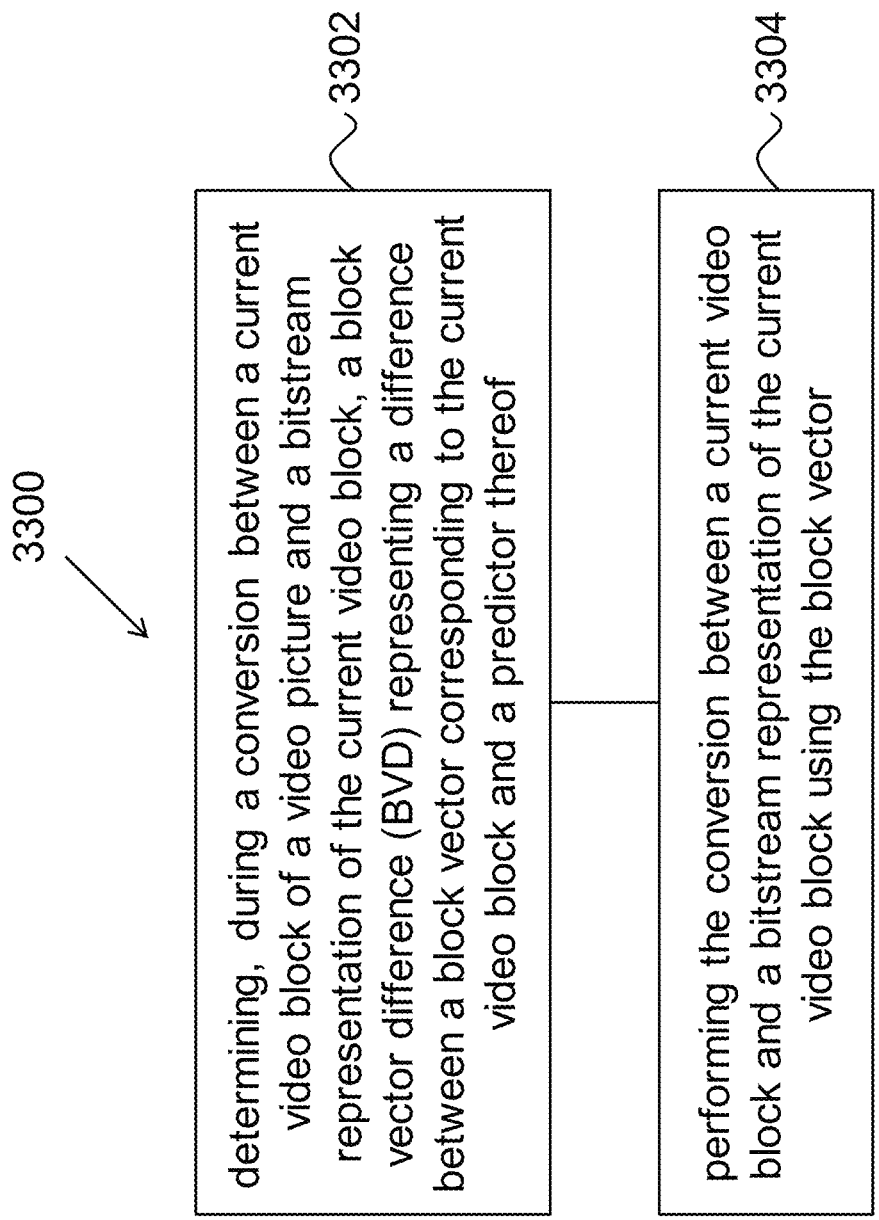
FIG. 33 is a flowchart for an example method of video processing.

FIG. 33 is a flowchart of an example method 3300 of video processing. The method includes determining (3302), during a conversion between a current video block of a video picture and a bitstream representation of the current video block, a block vector difference (BVD) representing a difference between a block vector corresponding to the current video block and a predictor thereof, wherein the block vector indicates a motion match for the current video block in the video picture; and wherein a modified value of the BVD is coded in the bitstream representation; and performing (3304) the conversion between a current video block and a bitstream representation of the current video block using the block vector. The predictor of the BVD may be computed during the conversion based on one or more previous block vectors used for conversion of previous video blocks.

Various solutions and embodiments described in the present document are further described using a list of solutions.

The following solutions are examples of techniques listed in Item 1 Section 4.

1. A method of video processing, comprising: determining, during a conversion between a current video block of a video picture and a bitstream representation of the current video block, a block vector difference (BVD) representing a difference between a block vector corresponding to the current video block and a predictor thereof, wherein the block vector indicates a motion match for the current video block in the video picture; and wherein a modified value of the BVD is coded in the bitstream representation; and performing the conversion between a current video block and a bitstream representation of the current video block using the block vector.

2. The method of solution 1, wherein the modified value of the BVD comprises a result of adding an offset BH to a y component BVDy of the BVD.

3. The method of solution 1, wherein the modified value of the BVD comprises a result of adding an offset BW to a x component BVDx of the BVD.

4. The method of solution 1, wherein the modified value of the BVD is obtained by checking whether or not the BVD is from a BVD value set.

5. The method of solution 1, wherein the modified value of the BVD is obtained from the BVD by using a modification technique that depends on a value or a magnitude of the BVD.

The following solutions are examples of techniques listed in Item 2 Section 4.

1. A method of video processing, comprising: determining, during a conversion between a current video block of a video picture and a bitstream representation of the current video block, to use an intra block copy tool for the conversion; and performing the conversion using a modified block vector predictor that corresponds to a modified value of a block vector difference (BVD) for the current video block.

2. The method of solution 1, wherein the conversion further uses a value of the (BVD) corresponding to a field in the bitstream representation.

3. The method of any of solutions 1-2, wherein the conversion uses a block vector derived from the modified value and the BVD.

The following solutions are examples of techniques listed in Item 3 Section 4.

1. A method of video processing, comprising: performing a conversion between a current video block of a video picture and a bitstream representation of the current video block using an intra block copy coding tool in which a modified block vector corresponding to a modified value of a block vector that is includes in the bitstream representation is used for the conversion.

2. The method of solution 1, wherein the conversion includes performing sample copying from another region of the video picture references by the modified block vector.

3. The method of any of solutions 1-2, wherein the modified value of the block vector is obtained by adding an offset BH to a y component BVy of the block vector.

4. The method of any of solutions 1-2, wherein the modified value of the block vector is obtained by adding an offset BW to a x component BVx of the block vector.

5. The method of any of solutions 1-4, wherein the modified value further is checked for validity.

The following solutions are examples of techniques listed in Item 4 Section 4.

1. The method of above solutions, wherein the modification is done in an order.

2. The method of solution 1, wherein the order comprises first modifying a horizontal component and then modifying a vertical component of the block vector or the block vector difference.

The following solutions are examples of techniques listed in Items 5 and 6 Section 4.

1. The method of any of above solutions, wherein the modified block vector or the modified block vector difference is further used to form motion vector predictors.

2. The method of any of above solutions, wherein the modifying uses offset values that are signaled in the bitstream representation.

3. The method of solution 2, wherein the offset values are signaled at a sequence parameter set level or a picture parameter set level or a slice level or a tile group level or a tile level or a brick level or a coding tree unit level.

The following solutions are examples of techniques listed in Item 7 Section 4.

1. The method of any of above solutions wherein the modifying is performed due to the current video block being in an allowed region in the video picture.

2. The method of solution 1, wherein the allowed region excludes boundaries of the video picture or a video slice or a tile group.

The following solutions are examples of techniques listed in Item 8 Section 4.

1. A method of video processing, comprising: determining, during a conversion between a current video block and a bitstream representation of the current video block, a weighting factor wt based on a condition of the current video block; and performing the conversion using a combined intra-inter coding operation in which the weighting factor wt is used for weighting a motion vector of the current video block.

2. The method of solution 1, wherein the condition depends on whether or not x or y component of the motion vector is zero.

3. The method of any of solutions 1-2, wherein the condition is based on pel resolution of the motion vector.

The following solutions are examples of techniques listed in Items 9 and 10 of Section 4.

1. A method of video processing, comprising: determining, to use a triangular partitioning mode (TPM) coding tool for a conversion between a current video block and a bitstream representation of the current video block, wherein at least one operational parameter of the TPM coding tool depends on a characteristic of the current video block, wherein the TPM coding tool partitions the current video block into two non-rectangular partitions that are separately coded; and performing the conversion by applying the TPM coding tool that uses the one operational parameter.

2. The method of solution 1, wherein the operational parameter comprises weights applied to the two non-rectangular partitions.

3. The method of any of solutions 1-2, wherein the characteristic of the current video corresponds to whether or one or both of motion component of the current video block is zero.

4. The method of any of solutions 1-3, wherein the operational parameter comprises applicability of a blending process used on the current video block during the conversion.

5. The method of solution 4, wherein the blending process is disabled in a case that a transform skip mode is selected for the current video block.

The following solutions are examples of techniques listed in Item 11, Section 4.

1. The method of any of above solutions, wherein a characteristic of coded content of the current video block is used in determining operation of the method.

2. The method of any of above solutions, wherein a content type of the current video block is used in determining operation of the method.

Additional solutions include:

1. A video encoding apparatus comprising a processor configured to implement a method recited in any one or more of the above solutions.

2. A video decoding apparatus comprising a processor configured to implement a method recited in any one or more of the above solutions.

3. A machine readable medium having stored code for implementing one or more of the above methods by a processor.

Figure 34:
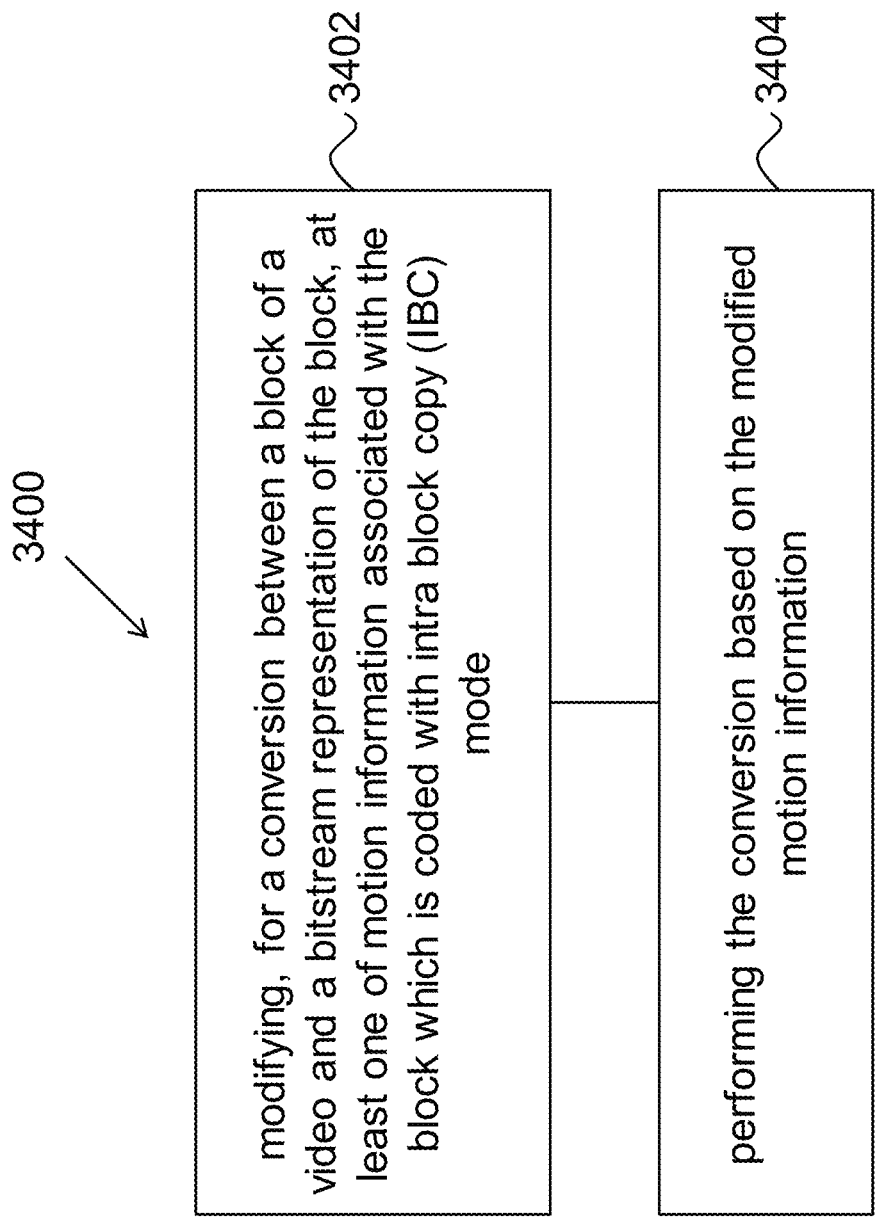
FIG. 34 is a flowchart for an example method of video processing.

FIG. 34 is a flowchart of an example method 3400 of video processing. The method includes modifying (3402), for a conversion between a block of a video and a bitstream representation of the block, at least one of motion information associated with the block which is coded with intra block copy (IBC) mode; and performing (3404) the conversion based on the modified motion information.

In some examples, the motion information includes a block vector difference (BVD) representing a difference between a block vector for the block and a block vector predictor for the block, and the modified BVD is coded in the bitstream representation.

In some examples, a vertical component BVDy of the BVD is modified to (BVDy+BH), wherein BH is a constant.

In some examples, BH is 128 or −128.

In some examples, BH is the height of a coding tree unit (CTU) of the block or minus the height of a CTU.

In some examples, BH depends on the block dimension and/or block position and/or IBC reference region sizes of the block.

In some examples, a horizontal component BVDx of the BVD is modified to (BVDy+BW), wherein BW is a constant.

In some examples, BW is 128 or −128.

In some examples, BW is 128*128/S, wherein S is (coding tree unit (CTU) size or coding tree block (CTB) size), or minus 128*128/S(CTU size or CTB size).

In some examples, BW depends on the block dimension and/or block position and/or IBC reference region sizes of the block.

In some examples, the modification is performed for certain BVD value set BVDS1, and is not performed for certain BVD value set BVDS2, and a syntax is signaled for all other BVD values to indicate whether the modification is applied or not.

In some examples, whether to and/or how to modify BVD depend on the sign and/or magnitude of the difference.

In some examples, when BVDy>BH/2, BVDy is modified to (BVDy−BH).

In some examples, when BVDy<−BH/2, BVDy is modified to (BVDy+BH).

In some examples, when BVDx>BW/2, BVDx is modified to (BVDx−BW).

In some examples, when BVDx<−BH/2, BVDx is modified to (BVDx+BW).

In some examples, the motion information includes block vector predictors (BVPs) for the block and the modified BVPs are used for decoding the block.

In some examples, the modified BVPs are used together with signalled block vector differences (BVDs) to derive final block vector (BV) for the block in an Advanced motion vector prediction (AMVP) mode, wherein BVD represents a difference between a BV for the block and a BVP for the block.

In some examples, the modified BVPs are directly used as final BV for the block in a merge mode.

In some examples, a vertical component BVPy of the BVP is modified to (BVPy+BH), wherein BH is a constant.

In some examples, BH is 128 or −128.

In some examples, BH is the height of a coding tree unit (CTU) of the block or minus the height of a CTU.

In some examples, BH depends on the block dimension and/or block position and/or IBC reference region sizes of the block.

In some examples, a horizontal component BVPx of the BVP is modified to (BVPy+BW), wherein BW is a constant.

In some examples, BW is 128 or −128.

In some examples, BW is 128*128/S, wherein S is coding tree unit (CTU) size or coding tree block (CTB) size, or minus 128*128/S.

In some examples, BW depends on the block dimension and/or block position and/or IBC reference region sizes of the block.

In some examples, the modification is performed for certain BVP value set BVPS1, and is not performed for certain BVP value set BVPS2, and a syntax is signaled for all other BVP values to indicate whether the modification is applied or not.

In some examples, whether to and/or how to modify BVP depend on the sign and/or magnitude of the BVP.

In some examples, when BVPy=BVPx=0, (BVPx, BVPy) is modified to (−64, −64).

In some examples, the motion information includes decoded block vectors (BVs) for IBC mode and the modified BVs are used to identify reference blocks for sample copying.

In some examples, a vertical component BVy of the BV is modified to (BVy+BH) when BVy is used, wherein BH is a constant.

In some examples, BH is 128 or −128.

In some examples, BH is the height of a coding tree unit (CTU) or a coding tree block (CTB) of the block or minus the height of a CTU or a CTB.

In some examples, BH depends on the block dimension and/or block position and/or IBC reference region sizes of the block.

In some examples, a horizontal component BVx of the BV is modified to (BVy+BW) when BVx is used, wherein BW is a constant.

In some examples, BW is 128 or −128.

In some examples, BW is 128*128/(coding tree unit (CTU) size or coding tree block (CTB) size), or minus 128*128/(CTU size or CTB size).

In some examples, BW depends on the block dimension and/or block position and/or IBC reference region sizes of the block.

In some examples, a motion vector after the modifications needs to be valid.

In some examples, a valid motion vector corresponds to a prediction block not overlapped with the block.

In some examples, a valid motion vector corresponds to a prediction block inside a current picture.

In some examples, a valid motion vector corresponds to a prediction block with all samples reconstructed.

In some examples, the modified BVs are stored and used for motion prediction or/and deblocking.

In some examples, whether to and/or how to modify BVs depend on magnitude of at least one component of the BV.

In some examples, when (CBy+BVy)/(CTU or CTB height)<CBy/(CTU or CTB height), BVy is modified to (BVy+(CTU or CTB height)), CBx and CBy representing a position of a block relative to the upper-left position of a picture.

In some examples, when (CBy+W+BVy)/(CTU/CTB height)>CBy/(CTU/CTB height), BVy is modified to (BVy−(CTU/CTB height)), CBx and CBy representing a position of a block relative to the upper-left position of a picture, W and H representing the width and height of the block.

In some examples, when (BVx, BVy) is invalid, BVx is modified to (BVx+BW) if block vector (BVx−BW, BVy) is valid, where BVy is unmodified or modified vertical component.

In some examples, when (BVx, BVy) is invalid, BVx is modified to (BVx+BW) if block vector (BVx+BW, BVy) is valid, where BVy is unmodified or modified vertical component.

In some examples, the modifications for different components follow a predetermined order.

In some examples, the modification to BVDx is before modification to BVDy.

In some examples, the modification to BVy is before modification to BVx.

In some examples, motion vector predictors associated with the block are formed based on the modified BV or BVD.

In some examples, history-based motion vector prediction (HMVP) is based on the modified BV or BVD.

In some examples, merge candidates are based on the modified BV or BVD.

In some examples, Advanced motion vector prediction (AMVP) is based on the modified BV or BVD.

In some examples, the constants BW and BH are predefined, or signalled in at least one of SPS, PPS, Slice, Tile group, Tile, Brick and CTU level.

In some examples, the modification is disabled when the block is located on at least one of picture boundary, Slice boundary and Tile group boundary.

In some examples, when the vertical position of the block relative to the most top left position of at least one of a picture, Slice or Tile group is 0, BH is set to 0.

In some examples, when the horizontal position of the block relative to the most top left position of at least one of a picture, Slice or Tile group is 0, BW is set to 0.

(7.b)

Figure 35:
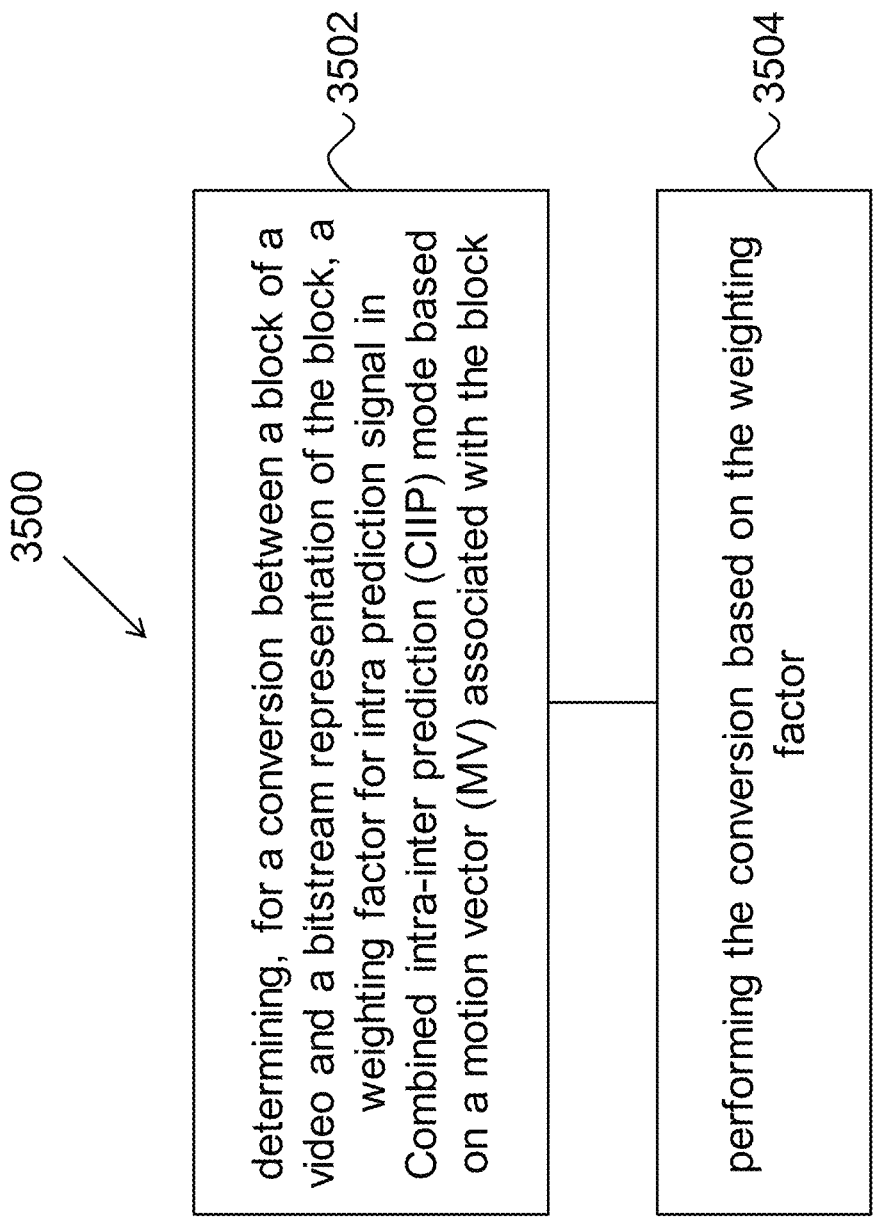
FIG. 35 is a flowchart for an example method of video processing.

FIG. 35 is a flowchart of an example method 3500 of video processing. The method includes determining (3502), for a conversion between a block of a video and a bitstream representation of the block, a weighting factor for intra prediction signal in Combined intra-inter prediction (CIIP) mode based on a motion vector (MV) associated with the block; and wherein a modified value of the BVD is coded in the bitstream representation; and performing (3504) the conversion based on the weighting factor.

In some examples, when horizontal component of the MV is equal to 0 or vertical component of the MV is equal to 0, the weighting factor for intra prediction signal is set to 1.

In some examples, when the MV is pointing to integer-pel or with integer precision, the weighting factor for intra prediction signal is set to 1.

Figure 36:
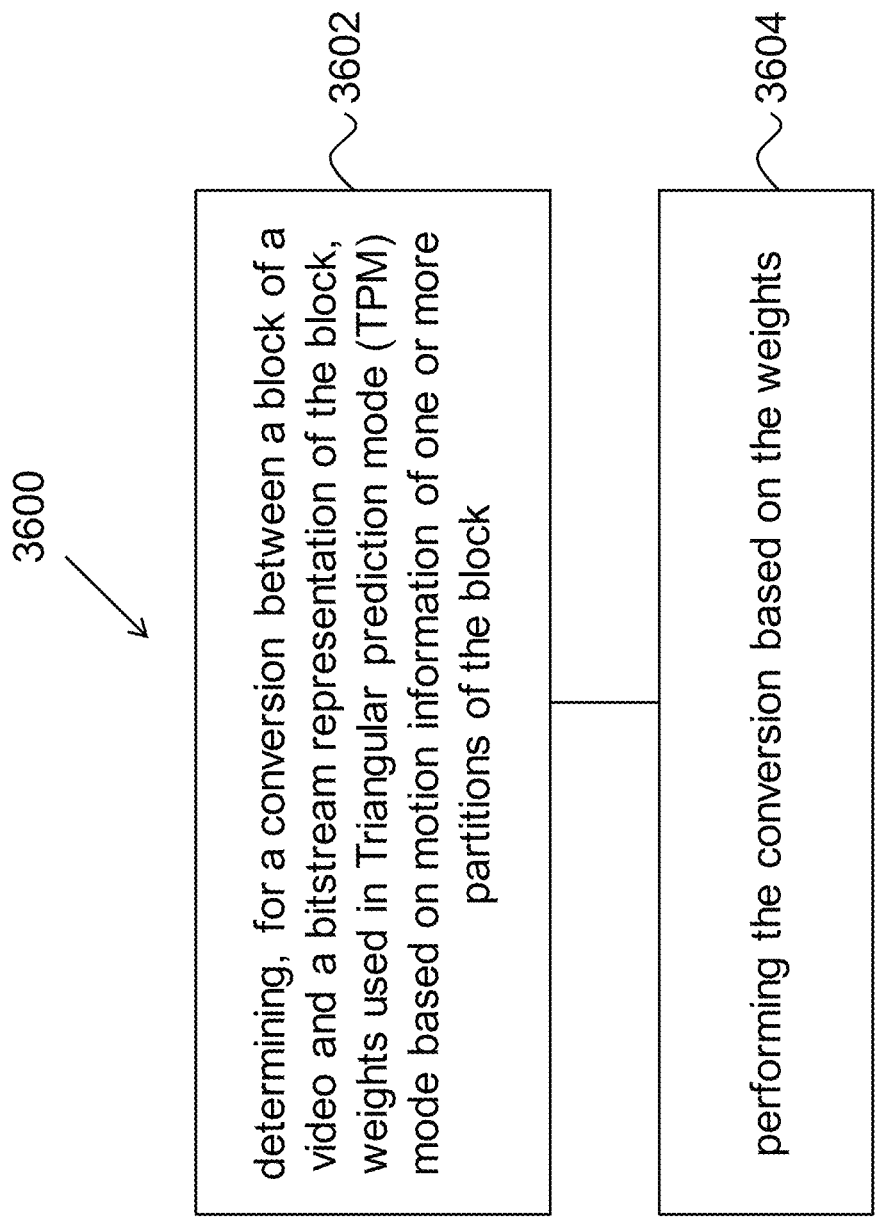
FIG. 36 is a flowchart for an example method of video processing.

FIG. 36 is a flowchart of an example method 3600 of video processing. The method includes determining (3602), for a conversion between a block of a video and a bitstream representation of the block, weights used in Triangular prediction mode (TPM) mode based on motion information of one or more partitions of the block; and performing (3604) the conversion based on the weights.

In some examples, the block is split into an upper-right partition and a bottom-left partition by using anti-diagonal split or is split into an upper-left partition and a bottom-right partition by using diagonal split, and the block has a width W and a height H.

In some examples, the weights are determined depending on whether one or multiple components of motion vector (MV) associated with one partition is equal to 0, wherein the components of the MV include a horizontal component MVx and a vertical component MVy.

In some examples, when MVx is equal to 0 or MVy is equal to 0 for the upper-right partition in TPM mode, and W>=H, for first samples satisfying floor(x*H/W)<=y, the weights are set to 1.

In some examples, for samples other than the first samples, the weights are set to 0.

In some examples, when MVx is equal to 0 or MVy is equal to 0 for the upper-right partition in TPM mode, and W<H, for first samples satisfying x<=floor(y*W/H), the weights are set to 1.

In some examples, for samples other than the first samples, the weights are set to 0.

In some examples, when MVx is equal to 0 or MVy is equal to 0 for the bottom-left partition in TPM mode, and W>=H, for first samples satisfying floor(x*H/W)<=y, the weights are set to 1.

In some examples, for samples other than the first samples, the weights are set to 0.

In some examples, when MVx is equal to 0 or MVy is equal to 0 for the bottom-left partition in TPM mode, and W<H, for first samples satisfying x<=floor(y*W/H), the weights are set to 1.

In some examples, for samples other than the first samples, the weights are set to 0.

In some examples, when MVx is equal to 0 or MVy is equal to 0 for the upper-left partition in TPM mode, and W>=H, for first samples satisfying floor((W−1−x)*H/W)>=y, the weights are set to 1.

In some examples, for samples other than the first samples, the weights are set to 0.

In some examples, when MVx is equal to 0 or MVy is equal to 0 for the upper-left partition in TPM mode, and W<H, for first samples satisfying (W−1−x)>=floor(y*W/H), the weights are set to 1.

In some examples, for samples other than the first samples, the weights are set to 0.
(9.g.i)

In some examples, when MVx is equal to 0 or MVy is equal to 0 for the bottom-right partition in TPM mode, and W>=H, for first samples satisfying floor((W−1−x)*H/W)<=y, the weights are set to 1.

In some examples, for samples other than the first samples, the weights are set to 0.

In some examples, when MVx is equal to 0 or MVy is equal to 0 for the bottom-right partition in TPM mode, and W<H, for first samples satisfying (W−1−x)<=floor(y*W/H), the weights are set to 1.

In some examples, for samples other than the first samples, the weights are set to 0.

Figure 37:
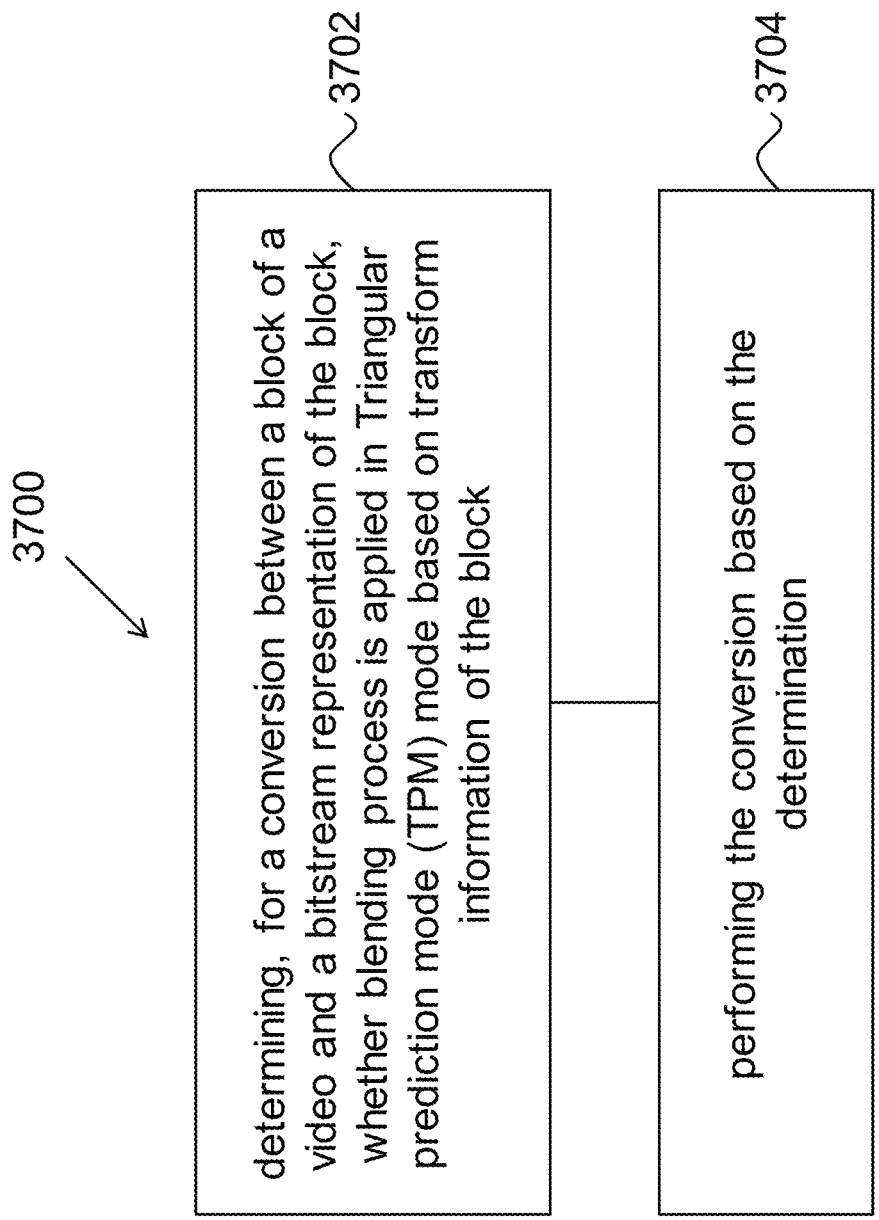
FIG. 37 is a flowchart for an example method of video processing.

FIG. 37 is a flowchart of an example method 3700 of video processing. The method includes determining (3702), for a conversion between a block of a video and a bitstream representation of the block, whether blending process is applied in Triangular prediction mode (TPM) mode based on transform information of the block; and performing (3704) the conversion based on the determination.

In some examples, when transform skip mode is selected, the blending process is not applied.

In some examples, when the block has no non-zero residual, the blending process is not applied.

In some examples, when transform is selected, the blending process is applied.

In some examples, when the blending process is not applied, the prediction sample of partition X of the block is generated only using motion information of the partition X, wherein X is 0 or 1.

In some examples, whether to enable the modification or the determination depend on at least one of the following:
 a. characteristics of coded content;
 b. content type including screen content and camera-captured content;
 c. a flag at at least one of SPS, PPS, Slice, Tile group, Tile, Brick, CTU, other video unit level; and;
 d. coded information of the block.

In some examples, the conversion generates the block of video from the bitstream representation.

In some examples, the conversion generates the bitstream representation from the block of video.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for video processing, comprising:
    modifying, for a conversion between a block of a video and a bitstream of the block, at least one motion information associated with the block which is coded with intra block copy (IBC) mode to generate a modified motion information; and
    performing the conversion based on the modified motion information,
    wherein the at least one motion information has a vertical component and a horizontal component, wherein the vertical component (My) of the at least one motion information (M) is modified to (My+BH), and the horizontal component (Mx) of the at least one motion information (M) is modified to (Mx+BW), wherein both BH and BW are constants,
    wherein the at least one motion information includes:
        (a) a block vector difference (BVD) which represents a difference between a block vector for the block and a block vector predictor for the block and, in this case, a modified BVD is coded in the bitstream,
        (b) block vector predictors (BVPs) for the block and, in this case, modified BVPs are used for decoding the block, and
        (c) decoded block vectors (BVs) for IBC mode and, in this case, modified decoded BVs are used to identify reference blocks for sample copying.

2. The method of claim 1, wherein BH is 128 or −128, and wherein BW is 128 or −128.

3. The method of claim 1, wherein BH is a height of a coding tree unit (CTU) of the block or minus the height of the CTU, wherein BW is a width of the CTU or minus the width of the CTU, wherein BW is 128*128/S or minus 128*128/S, and wherein S is a coding tree unit (CTU) size or a coding tree block (CTB) size.

4. The method of claim 1, wherein BH or BW depends on a block dimension and/or a block position and/or IBC reference region sizes of the block.

5. The method of claim 1, wherein the modified BVPs are used together with signalled block vector differences (BVDs) to derive a final block vector (BV) for the block in an Advanced motion vector prediction (AMVP) mode.

6. The method of claim 1, wherein the modified BVPs are directly used as final BV for the block in a merge mode.

7. The method of claim 1, wherein the modifying is performed for certain motion information (BVD, BVP) value set (BVDS1, BVPS1), and is not performed for certain motion information (BVD, BVP) value set (BVDS2, BVPS2), and wherein a syntax is signalled for all other motion information (BVD, BVP) values to indicate whether the modifying is applied or not.

8. The method of claim 1, wherein the modifying for different components follow one of two predetermined orders: (1) a modification to a horizontal component (BVDx) of the BVD is before a modification to a vertical component (BVDy) of the BVD; and (2) a modification to a vertical component (BVy) of a BV is before a modification to a horizontal component (BVx) of the BV.

9. The method of claim 1, wherein motion vector predictors associated with the block are formed based on the modified BVs or the modified BVD.

10. The method of claim 9, wherein history-based motion vector prediction (HMVP), merge candidates, or Advanced motion vector prediction (AMVP) is based on the modified BVs or the modified BVD.

11. The method of claim 1, wherein BW and BH are predefined, or signalled in at least one of a sequence parameter set (SPS), a picture parameter set (PPS), a Slice, a Tile group, a Tile, a Brick, or a coding tree unit (CTU) level.

12. The method of claim 1, wherein the modifying is disabled when the block is located on at least one of a picture boundary, a Slice boundary, or a Tile group boundary.

13. The method of claim 12, wherein when a vertical position or a horizontal position of the block relative to a most top left position of at least one of a picture, a Slice, or a Tile group is 0, and wherein BH or BW is set to 0.

14. The method of claim 1, wherein whether to enable the modifying depends on at least one of the following:
   a. characteristics of coded content;
   b. content type including screen content and camera-captured content;
   c. a flag at at least one of a sequence parameter set (SPS), a picture parameter set (PPS), a Slice, a Tile group, a Tile, a Brick, a coding tree unit (CTU), or a video unit level different from the SPS, the PPS, the slice, the tile group, the brick, and the CTU; and;
   d. coded information of the block.

15. The method of claim 1, wherein the conversion including encoding the block of video into the bitstream.

16. The method of claim 1, wherein the conversion includes decoding the bitstream from the block of video.

17. An apparatus for processing video data comprising a processor and a non-transitory memory with instructions thereon, wherein the instructions upon execution by the processor, cause the processor to:
   modify, for a conversion between a block of a video and a bitstream of the block, at least one motion information associated with the block which is coded with intra block copy (IBC) mode to generate a modified motion information; and
   perform the conversion based on the modified motion information;
   wherein the at least one motion information has a vertical component and a horizontal component, wherein the vertical component (My) of the at least one motion information (M) is modified to (My+BH), and the horizontal component (Mx) of the at least one motion information (M) is modified to (Mx+BW), wherein both BH and BW are constants,
   wherein the at least one motion information includes:
      (a) a block vector difference (BVD) which represents a difference between a block vector for the block and a block vector predictor for the block and, in this case, a modified BVD is coded in the bitstream,
      (b) block vector predictors (BVPs) for the block and, in this case, modified BVPs are used for decoding the block, and
      (c) decoded block vectors (BVs) for IBC mode and, in this case, modified decoded BVs are used to identify reference blocks for sample copying.

18. A non-transitory computer readable recording medium storing a bitstream of a video which is generated by a method performed by a video processing apparatus, wherein the method comprising:
   modifying at least one motion information associated with a block of the video which is coded with intra block copy (IBC) mode to generate a modified motion information; and
   generating the bitstream based on the modified motion information;
   wherein the at least one motion information has a vertical component and a horizontal component, the vertical component (My) of the at least one motion information (M) is modified to (My+BH), and the horizontal component (Mx) of the at least one motion information (M) is modified to (Mx+BW), wherein both BH and BW are constants,
   wherein the at least one motion information includes:
      (a) a block vector difference (BVD) which represents a difference between a block vector for the block and a block vector predictor for the block and, in this case, a modified BVD is coded in the bitstream,
      (b) block vector predictors (BVPs) for the block and, in this case, modified BVPs are used for decoding the block, and
      (c) decoded block vectors (BVs) for IBC mode and, in this case, modified decoded BVs are used to identify reference blocks for sample copying.

* * * * *